United States Patent [19]

Shibata et al.

[11] Patent Number: 5,526,495
[45] Date of Patent: Jun. 11, 1996

[54] BUS CONTROL SYSTEM IN A MULTI-PROCESSOR SYSTEM

[75] Inventors: Yuji Shibata; Makoto Okazaki; Hisamitsu Tanihira, all of Kawasaki, Japan

[73] Assignee: Fujitsu Limited, Kawasaki, Japan

[21] Appl. No.: 110,752

[22] Filed: Aug. 23, 1993

Related U.S. Application Data

[63] Continuation of Ser. No. 663,469, Feb. 4, 1991, abandoned.

[30] Foreign Application Priority Data

| Mar. 2, 1990 | [JP] | Japan | 2-051461 |
| Mar. 20, 1990 | [JP] | Japan | 2-068145 |
| Mar. 20, 1990 | [JP] | Japan | 2-071514 |

[51] Int. Cl.⁶ .......................... G06F 13/42; G06F 13/36; G06F 13/00; G06F 15/16
[52] U.S. Cl. .......................... 395/307; 395/293; 395/280; 395/200.02; 395/200.06; 364/240; 364/240.2; 364/240.3; 364/242.6; 364/242.92; 364/DIG. 1
[58] Field of Search .......................... 395/325, 725, 395/275, 425, 307, 293, 280, 200.02, 200.06, 287, 294, 306; 340/825.5, 825.51; 370/85.2, 85.6

[56] References Cited

U.S. PATENT DOCUMENTS

| 4,214,305 | 7/1980 | Tokita et al. | 395/293 |
| 4,263,649 | 4/1981 | Lapp, Jr. | 395/325 |
| 4,375,639 | 3/1983 | Johnson, Jr. | 340/825.5 |
| 4,608,631 | 8/1986 | Stiffler et al. | 395/325 |
| 4,667,305 | 5/1987 | Dill et al. | 395/307 |
| 4,766,538 | 8/1988 | Miyoshi | 395/307 |
| 4,785,394 | 11/1988 | Fischer | 395/325 |
| 4,818,985 | 4/1989 | Ikeda | 340/825.5 |
| 4,837,682 | 6/1989 | Culler | 395/325 |
| 4,858,108 | 8/1989 | Ogawa | 395/275 |
| 4,896,256 | 1/1990 | Roberts | 395/325 |
| 5,113,369 | 5/1992 | Kinoshita | 395/325 |
| 5,148,539 | 9/1992 | Enomoto et al. | 395/425 |
| 5,341,481 | 8/1994 | Tsukamoto | 395/325 |
| 5,345,559 | 9/1994 | Okazaki et al. | 395/250 |
| 5,388,227 | 2/1995 | McFarland | 395/307 |
| 5,454,084 | 9/1995 | Uchikoga | 395/281 |

FOREIGN PATENT DOCUMENTS

| 86/03606 | 6/1986 | WIPO | G06F 9/46 |

OTHER PUBLICATIONS

Partial European Search Report, The Hague, Oct. 20, 1993.

*Primary Examiner*—Gopal C. Ray
*Attorney, Agent, or Firm*—Staas & Halsey

[57] ABSTRACT

A bus arbiter permits an answer transfer request to utilize a system bus with higher priority than a command transfer request, thereby increasing the processing efficiency of CPU boards. A multi-processor system utilize the system bus with a time split transfer system in which the data width of a unit is inserted into a command and an answer transmitted and received between processors and transmitted as bus width information, thus making it possible to interconnect a unit, which processes data of an arbitrary data width, to the system bus. Local memories of a plurality of units connected to the system bus can be accessed via a bus interface of an input and output unit.

8 Claims, 29 Drawing Sheets

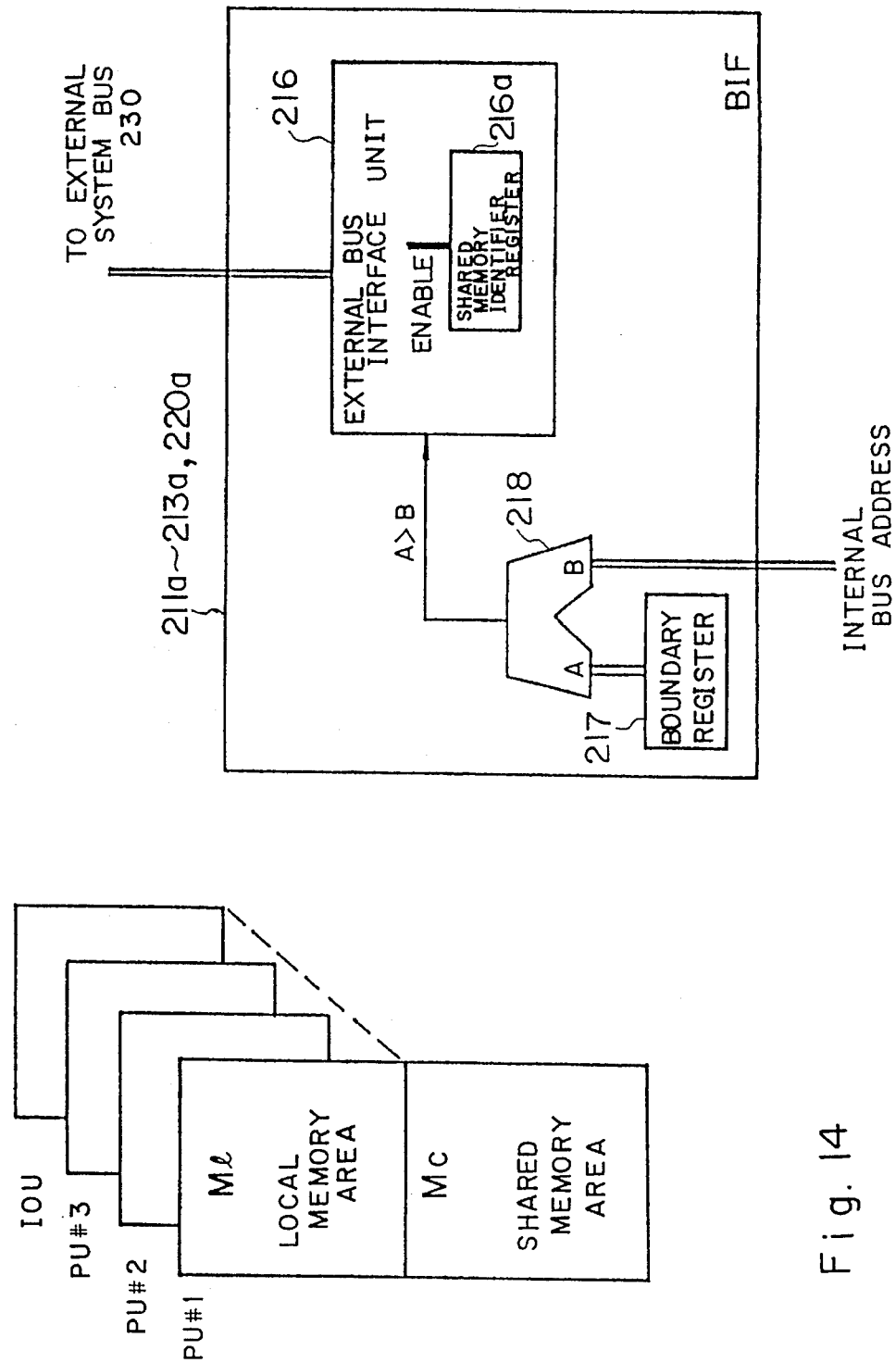

Fig. 21A  C (COMMAND)

| UNIT NUMBER | BW | RW | ETC |
|---|---|---|---|
| DU | SU | | |

Fig. 21B  AN (ANSWER)

| UNIT NUMBER | BW | ETC |
|---|---|---|
| DU | SU | |

Fig. 21C  RECEPTION CONTROL BUFFER

| POINTER P | RW | BW | BYTE NUMBER BT | SU | ETC |
|---|---|---|---|---|---|

Fig. 21D  TRANSMISSION CONTROL BUFFER

| POINTER P | / | BW | BYTE NUMBER BT | ETC |
|---|---|---|---|---|

DU: DESTINATION UNIT NUMBER
SU: SENDING UNIT NUMBER
BW: BUS WIDTH INFORMATION
RW: READ/WRITE INFORMATION
P: POINTER
BT: BYTE NUMBER
ETC: OTHER INFORMATION

А
5,526,495

BUS CONTROL SYSTEM IN A MULTI-PROCESSOR SYSTEM

This application is a continuation of application Ser. No. 07/663,469, filed Feb. 4, 1991, now abandoned.

BACKGROUND OF THE INVENTION

1. Field of the Invention

The present invention generally relates to a system bus control system in a multi-processor system and, more particularly, is directed to a system bus utilization request system, an inter-unit communication system in a multi-processor system employing a system bus of a time split transfer system and a multi-processor system having a shared memory.

2. Description of the Related Art

A multi-processor system has recently been used to construct a control unit of a computer, an electronic switching system and the like. In this system, a plurality of processors are interconnected via a single system bus to share hardware and software resources, thereby improving throughput, expandability and reliability.

Furthermore, a bus arbiter for controlling and arbitrating a utilization right of a system bus is accessed, to enable a plurality of processors to transmit and receive data between them and other processors via the single system bus and a memory to be interconnected to the system bus.

FIG. 1 is a schematic block diagram showing an example of an arrangement of a conventional multi-processor system having such a bus arbiter.

Referring to FIG. 1, a plurality of CPU (central processing unit) boards (processor units) $CPU_0$ to $CPU_N$, memory boards (memory units) $CM_0$ to $CM_N$ and a bus arbiter (BA) 12 are interconnected to a system bus 11. The bus arbiter 12 is adapted to control and arbitrate the bus utilization right of each board.

FIGS. 2A and 2B show arrangements of each CPU board CPUi (i=0, 1, ..., N) and memory board CMj, respectively. As shown in FIG. 2A, each CPU board CPUi is composed of a microprocessor (μP) 15, a control register (CTLREG) 16 and a bus interface (BIF) 14 and, as shown in FIG. 2B, each memory board CMj is composed of a RAM (random access memory) 18, a RAM controller 17 and the bus interface 14. The bus interface 14 controls the interconnection between a local bus 13 and the system bus 11 within the board.

A data transfer system called a time split system is known for a system bus in the multi-processor system. In this system, a command transfer cycle and an answer transfer cycle are separated.

FIG. 3 is a diagram showing an example of a timing in which a command and an answer are transmitted in the system bus of the time split transfer system. This example illustrates a case where a CPU board CPUi reads data D stored in a memory address A from a memory CMj.

CPUi of a CPU board transmits a bus request signal RQi to the bus arbiter 12 before transmitting a command C and a memory address A to memory CMj. When receiving a transfer permission signal GRi from the arbiter 12, the CPU board CPUi transmits the command C and the memory address A to the memory board CMj through the system bus 11. When receiving the command C and the memory address A through the system bus 11, the memory board CMj transmits the transfer request signal RQi to the bus arbiter 12 in order to transmit an answer AN and the data D stored in the memory address A to the CPU board CPUi. When receiving the transfer permission signal GRj from the bus arbiter 12, the memory board CMj transmits the answer AN and the data D to the CPUi via the system bus 11.

As described above, in the system bus of the conventional time split transfer system, when each CPU board transmits the command C or the answer AN, each CPU board must transmit the bus request signal to the bus arbiter 12 individually.

FIG. 4 is a block circuit diagram of the bus interface 14 provided within each CPU board CPUi and memory board CMj.

As shown in FIG. 4, the bus interface 14 includes a transmission FIFO 21 of a first in first-out system which stores transmission data and a reception FIFO 22 of a first-in first-out system which stores reception data. Buffers 23, 25 and buffers 24, 26 are respectively provided between these FIFOs 21, 22, the local bus 13 and the system bus 11.

Transmission data are temporarily stored in buffer 23 and then in the transmission FIFO 21. Transmission data sequentially read out of the FIFO 21 are temporarily stored in the buffer 24 and then transmitted to the system bus 11.

Reception data are stored in buffer 26 and then stored in the reception FIFO 22. Reception data sequentially read out of the reception FIFO 22 are temporarily stored in buffer 25 and transmitted to the local bus 13.

Reception control units 27, 30 and transmission control units 28, 29 are adapted to control the writing and reading of these buffers 23 to 26 when data are transmitted and received. Transmission FIFO control unit 31 and a reception FIFO control unit 32 are adapted to instruct a write address and a read address of the transmission FIFO 21 and the reception FIFO 22, respectively.

FIG. 5 is a block diagram showing a specific arrangement of the transmission FIFO control unit 31 which is shown by the hatched portion in FIG. 4.

As shown in FIG. 5, an input address unit 33 is a circuit which instructs the write address of the transmission FIFO 21 and outputs an address, which is sequentially incremented by one, to the transmission FIFO 21 in accordance with a signal supplied thereto through an OR gate 34 from the reception control unit 27 or from the transmission control unit 29. Of the write addresses output from the input address unit 33, a breakpoint address of transmission data row is stored in a queue buffer 35. An output of the OR gate 34 is supplied to the transmission FIFO 21 as a data write signal WE and data are written into the transmission FIFO 21 in response to the data write signal WE.

The output address unit 36 is a circuit which instructs a read address of the transmission FIFO 21 and outputs addresses, which are sequentially incremented by one, to the transmission FIFO 21 in accordance with the read signal from the transmission control unit 28. The read address of the output address unit 36 and the breakpoint address of the transmission data row of the queue buffer 35 are compared by a comparator 37, and the reading of data in the transmission FIFO 21 is continued until the two addresses coincide.

An input completion display FF 38 is a flip-flop which is set by a signal from the reception control unit 27 or from the transmission control unit 29 via the OR gate 39 upon data transfer, and an output completion display FF 40 is a flip-flop which is set when the data transfer is finished.

A comparator 41 compares the outputs of flip-flops 38 and 40 to determine whether a command C or an answer AN transfer request signal RQ should be transmitted from the transmission control unit 28 or not.

For example, when the input completion display FF 38 is set and the output completion display FF 40 is reset, data to be transferred remain so the comparator 41 detects that the outputs of FFs 38 and 40 are not coincident. Thus, the transmission control unit 28 outputs the command C or the answer AN transfer request signal RQ.

In this time split transfer system, during the idle period other than that in which the command C or the answer AN is output, the system bus 11 is opened to each board. However, it is frequently observed that the system bus 11 is occupied between particular boards to perform data transfer, which is called a lock transfer.

FIG. 6 is a diagram showing examples of the command C format and the answer AN used in the lock transfer. As shown in FIG. 6, the command C is composed of a data field indicating destination, a data field indicating the unit from which data is transmitted, a data field indicating the kind of data and a data field indicating the data transfer amount. Also, the answer AN is composed of a data field indicating destination, a data field indicating the unit from which data is transmitted, a data field indicating the kind of data and a data field for the answer code.

FIG. 7 is a diagram used to explain the operation of the system upon lock transfer. The bus arbiter (BA) 12 is arranged such that, when receiving the lock transfer signal, the bus arbiter 12 recognizes the destination board from the destination data in the command C to receive only the transfer request from the destination board so as to transfer the answer AN.

FIG. 8 is a circuit block diagram showing a main portion of the bus arbiter. Reference will be made to this figure in explaining the bus arbiter's function of receiving only the transfer request from the destination board upon a lock transfer.

Referring to FIG. 8, destination data in the command C is stored in a destination buffer 51 and the destination data is decoded by a decoder (DEC) 52. The decoded data is thereby output to an OR gate group 54.

The command and the lock transfer signal are respectively input to a C/AN recognition circuit 56 and a lock recognition circuit 57. Outputs from these recognition circuits 56 and 57 are supplied through an AND gate 58 or an inverter 59 to a set terminal S or a reset terminal R of an RS flip-flop (RS-FF) 60. A $\overline{Q}$ output of the RS-FF 60 is supplied to one input terminal of OR gates 54-i (i= 0, 1, . . . , N) of the OR gate group 54. When the lock transfer signal is input to the RS-FF 60 and the $\overline{Q}$ output of the RS-FF 60 goes low level, one input terminal of OR gates 54-i of the OR gate group 54 all become low level and only the other input terminal of OR gate 54-i corresponding to the destination data stored in the destination buffer 51 becomes high level. Thus, of AND gate group 61, only AND gate 61-i corresponding to the destination data is opened to permit the transfer request signal from the destination data to be input to an arbitrating circuit 62.

The arbitrating circuit 62 issues a transfer permission signal $GR_1$ corresponding to the transfer request signal output from the AND gate group 61 at its AND gate 61-i corresponding to the destination data. Upon lock transfer, only the transfer request signal from the designated destination data stored in the destination buffer 51 becomes active and is input to the arbitrating circuit 62 as described above, with the result that the transfer permission signal GRi (i=0, 1, . . . , N) can be transmitted only to the designated destination board.

In the data transfer system of the time split system, the bus arbiter controls the transfer request signals of commands and answers from the respective boards interconnected to the system bus and sequentially issues the transfer permission signal in the order of boards having highest priority.

When the CPU board CPUi transfers the command and awaits the answer from the memory board CMj, if the command transfer request signal is output from a CPU board CPUn having higher priority, then the transfer permission signal is issued to the CPU board CPUn and the transfer of answer from the memory board CMj to the CPU board CPUi is awaited.

In general, the local bus 13 within the CPU board CPUi is of the interlock type such that the local bus 13 is held until it receives the answer from the destination board. Consequently, when the time split transfer system is utilized as the data transfer system of the system bus, there arises a problem that, until the answer is returned, other units within the board cannot utilize the local bus 13. Further, when the lock transfer system is employed as the data transfer system of the system bus, the system bus can be occupied only by a particular board so that the answer waiting time can be reduced. However, the circuit must be constructed such that the bus arbiter 12 identifies the destination board so that it receives only the transfer request from it and refuses transfer requests from other boards. Thus, a complicated circuit arrangement cannot be avoided.

The time split transfer system is effective for decreasing a system bus occupying ratio and for increasing a system bus utilization ratio in a particular CPU board (hereinafter referred to as a processor unit) in the multi-processor system.

In a multi-processor system employing a system bus which is not based on the time split transfer system, the occupying ratio in which the system bus is occupied by a particular processor unit is increased because such a processor unit exclusively occupies the system bus when it is allowed to use it. In the time split transfer system, however, such restriction does not occur because a plurality of processor units utilize the system bus in a time sharing manner, allowing other processor units to sequentially utilize the system bus without awaiting the answer to the access request. Therefore, respective processor units can execute different processings via the single system bus.

In either of the above two bus systems, an apparatus (hereinafter referred to as a unit) may be requested to be connected to the system bus so as to input and output data in a data width different from the bus width inherent in the system bus in accordance with the expansion of system function.

An example of an arrangement of such system is represented in the schematic block diagram in FIG. 9. FIG. 9 shows the arrangement of the multi-processor system which employs a system bus that does not use time split transfer system.

In this system, a system bus 100 includes a bus width information line 106 in addition to a data bus 102 and an address bus 104, and a plurality of units 110-1, 110-2, . . . , 110-N are connected to the system bus 100.

A data transfer operation of this system will be described below with reference to a timing chart of FIG. 10.

Referring to FIG. 9, when a first unit 110-j (j=1, 2, . . . , N; i≠ j) is accessed via the bus width information line 106 by a second unit 110-i (i= 1, 2, . . . , N) of the plurality of units 110-1, 110-2, . . . , 110-N, data and addresses are transferred through the data bus 102 and the address bus 104. Bus width information is also transferred through the bus width information line 106. When the reception unit 110-j receives the bus width information, the reception unit 110-j can identify the bus width of transferred data and can correctly transmit and receive data. Incidentally, the bus width information line 106 is occupied similarly to the data bus 102 and the address bus 104 (see (A), (B) and (C) of FIG. 10).

However, if the system shown in FIG. 9 is constructed by using the system bus of the time split transfer system, as shown in FIG. 11, the plurality of units 110-1, 110-2, . . . , 110-N are connected to a system bus 103 which is formed of an address bus and a data bus.

A data transfer operation between the units in the system shown in FIG. 11 employing the time split transfer system, system bus will be described next with a timing chart forming FIG. 12.

In the time split system, the single system bus is utilized in a time sharing fashion as described above. According to this time split system, before an answer (see answer AN1 in FIG. 12) is returned to a first unit for a command and an address (see command C1 and address A in FIG. 12) transmitted from the first unit, a command and an address (see command C2 and address B in FIG. 12) from a second unit are transmitted so that the bus width information cannot be held until the answer is returned to the first unit, unlike in the conventional bus system illustrated in FIG. 9. As a result, the transmission and reception of data having a data width different from the bus width of the system bus 103 (see FIG. 11) cannot be performed. There is then the problem that, in the conventional time split system, the unit having a data width different from the bus width of the system bus cannot be utilized in the system.

A sharing memory multi-processor system is used for sharing a hardware resource in the multi-processor system. In this system, a plurality of processors share one memory in use. To cope with control forms which presumably become more and more complicated, a wide variety of control must be realized by an input and output unit which is made common to respective processors interconnected to a system bus.

FIG. 13 is a block diagram showing an example of a system arrangement of a conventional sharing memory multi-processor system.

In FIG. 13, a shared memory (CM) 201, respective processor units (PU$_1$ to PU$_3$) 210-1 to 210-3 and an input and output unit (IOU) 220 are interconnected to a system bus 230. The shared memory 201 and the processor units 210-1 to 210-3 have bus interface circuits (BIF) 201a and 211a to 213a to which individual identifiers (IDs) are assigned so that they can recognize their own access by determining whether the identifier (ID) transmitted on the system bus 230 is equal to the identifiers (IDs) assigned to their bus interface circuits.

An image of a memory area which can be accessed by respective processor units 210-1 to 210-3 is represented in FIG. 14. In this example, half the memory space is utilized by a shared memory area Mc and the remaining half is utilized by local memory area Ml of respective processor units 210-1 to 210-3.

To access such memory space, a boundary address for indicating a boundary of addresses and identifiers (IDs) for the shared memory 201 are set between the bus interface circuits (BIF) 201a and 211a to 213a so that, when addresses of internal buses 211b to 213b provided within respective processor units 210-1 to 210-3 access the shared memory area Mc, as shown in FIG. 15 the shared memory 201 can be accessed via the system bus 230 by utilizing the identifier of the shared memory 201 set in a shared memory identifier register 216a provided within an external bus interface unit 216 within the bus interface circuits 211a to 213a of respective processor units 210-1 to 210-3. Thus, the local memory area Ml can be independently utilized only within respective processor units 210-1 to 210-3. In other words, respective processor units 210-1 to 210-3 cannot access the local memory area Ml of another processor unit. More specifically, when a comparator 218 detects that an internal bus address B is smaller than an address A previously set in a boundary register 217 (A> B), the external bus interface unit 216 shown in FIG. 15 is enabled, and if A< B, then the external bus interface unit 216 determines that the access is the access to the local memory area Ml so that the external bus interface unit 216 is not enabled.

A bus interface circuit 220a of the input and output unit (IOU) 220 shared by respective processor units 210-1 to 210-3 interconnected to the system bus 230 is also arranged as shown in FIG. 15. In this circuit, the access to the shared memory area Mc can be effected, but the local memory area Ml of each of the processor units 210-1 to 210-3 cannot be accessed. Accordingly, in the conventional shared memory multi-processor system, although the direct memory access (DMA) transfer of the shared memory area Mc can be carried out, the local memory area Ml of each of the processor units 210-1 to 210-3 cannot be accessed so that the input and output unit 230 cannot perform the DMA transfer to the local memory area Ml of each of the processor units 210-1 to 210-3 by the input and output apparatus 220b. This causes the problem that complex control cannot be achieved.

SUMMARY OF THE INVENTION

The present invention is made in view of the above-mentioned background. A first object of the present invention is to realize, in a bus arbiter control of a multi-processor, a bus utilization right request system with a simplified circuit arrangement which can reduce awaiting time for an answer.

A second object of the present invention is to provide an inter-unit communication system in which a plurality of units having different data widths for processing data can be fabricated into a system in a multi-processor system utilizing a system bus of a time split transfer system.

A third object of the present invention is to realize a multi-processor system having a shared memory in which an input and output unit interconnected to a system bus can access not only the shared memory but also a local memory of an arbitrary processor unit, thereby effecting a wide variety of control.

To achieve the first object, the present invention assumes a multi-processor system in which a plurality of CPU boards and memory boards are interconnected to a common system bus.

This multi-processor system is comprised of a bus interface for connecting the local bus within each of the boards to the system bus, a bus arbiter for arbitrating a system bus utilization right of each of the boards, command transfer request lines for transmitting a command transfer request from the CPU boards to the bus arbiter, answer transfer request signal lines for transmitting an answer transfer request, and answer transfer request lines for transmitting an answer request from the memory boards to the bus arbiter. When the transfer request is the command transfer request, the bus interface enables the command transfer request signal lines, and when the transfer request is the answer transfer request, the bus interface enables the answer transfer request signal lines. The bus arbiter identifies the command transfer request and the answer transfer request on the basis of the signal levels of the command transfer request signal lines and the answer transfer request signal lines and permits the answer transfer request to utilize the system bus with higher priority to the command transfer request.

In a preferred embodiment of the present invention, the bus interface includes memory means for storing queue additional information indicating whether the transfer request is the command transfer request or the answer transfer request of a data row at every breakpoint of the data row to be transmitted, wherein the bus interface enables the corresponding command transfer request lines or the corresponding answer transfer request lines on the basis of the queue additional information stored in the memory means.

Further, in the preferred embodiment of the present invention, the bus interface is composed of judging means for judging whether or not the transfer request signal is to be output, a first AND gate to which are input a judged result of the judging means and the queue additional information stored in the memory means, and a second AND gate to which are input the judged result of the judging means and inverted information of the queue additional information stored in the memory means, wherein the bus interface circuit enables the corresponding common transfer request signal lines via the first AND gate and enables the answer transfer request signal lines via the second AND gate.

A preferred embodiment of the bus arbiter is comprised of a first arbitrating circuit, a second arbitrating circuit and a transfer permission signal output circuit. The first arbitrating circuit is supplied with command transfer requests from respective boards and enables an output terminal corresponding to a board which outputs the enabled command transfer request having the highest priority. The second arbitrating circuit is supplied with answer transfer requests from respective boards and enables an output terminal corresponding to a board which outputs the enabled answer transfer request having the highest priority. The transfer permission signal output circuit is supplied with an output of the first arbitrating circuit and an output of the second arbitrating circuit. It gives higher priority to the transfer permission request to the answer transfer request output from the second arbitrating circuit regardless of the output of the transfer permission request to the command transfer request from the first arbitrating circuit when the second arbitrating circuit outputs the transfer permission request relative to the answer transfer request. It then outputs the transfer permission signal relative to the answer transfer request.

In this arrangement, the bus interface enables the corresponding signal lines by judging whether the transfer request is the command transfer request or the answer transfer request. When receiving the transfer request signal, the bus arbiter identifies on the basis of a judged result of the command transfer signals lines or the answer transfer request signal lines whether the transfer request is the command transfer request or the answer transfer request. Then, the bus arbiter permits the answer transfer request to utilize the system bus with higher priority.

Accordingly, the return of the answer is processed with priority to the command transfer request. Thus, the answer waiting time of the CPU board can be reduced and the processing efficiency of the CPU board can be enhanced.

In another preferred embodiment corresponding to the present invention, the bus arbiter processes the answer transfer request with priority upon lock transfer. Then, when receiving the answer transfer request upon lock transfer, the bus arbiter may interrupt the lock transfer and permit the board, transmitting the answer transfer request to utilize the system bus.

Accordingly, even in the lock transfer, the answer transfer request is processed with priority so that, if only the command transfer request is locked and an exclusive control is performed, functions required for the lock transfer can be satisfied.

The present invention for achieving the second object is based on a multi-processor system in which a plurality of units are connected to a time split transfer system system bus having a predetermined bus width. Each unit includes a bus interface comprising a receiving unit for receiving data from other units and a transmitting unit for transmitting data to other units through the system bus.

In a first type of data transmission relating to the second object, the transmitting unit of the bus interface is arranged such that an answer including bus width information indicating a bus width of data transmitted and received through the system bus by its own unit as an answer to the command received via the system bus is transmitted to the unit which transmitted the received command.

In a second type of data transmission relating to the second object, the transmitting unit of the bus interface is arranged such that bus width information indicative of bus width of data transmitted and received by its own unit through the system bus is included in the command transmitted to another unit via the system bus.

In a preferred embodiment of the invention which performs the second type of data transmission, the receiving unit of the bus interface includes bus width information extracting means for extracting bus width information from a received command. The receiving unit may be arranged so as to receive the data transmitted after a received command transmitted by the unit which transmitted the received command on the basis of the bus width information extracted by the bus width information extracting means.

In another preferred embodiment of the invention which performs the second type of data transmission, the receiving unit of the bus interface includes bus width information extracting means for extracting bus width information from a received command. Furthermore, the transmitting unit of the bus interface may be arranged such that, when the command received by the receiving unit is a data read command, the bus width information extracted by the bus width information extracting means is included in an answer relative to the received data read command, and is returned to the unit from which the data read command is transmitted.

In accordance with this arrangement, when returning an answer relative to a command received from a transmitting unit through the system bus of the time split system, the receiving unit inserts the bus width information output from the bus width information extracting means into the answer in a bus width information insertion unit and returns it to the transmitting unit.

Then the receiving unit recognizes the data width of data received after the reception command by extracting the bus width information from the reception command with the bus width information extracting means and processes the reception data.

Accordingly, the reception side unit can recognize the data width of the data received via the system bus of the time split transfer system and the transmission unit can recognize the data width of data received via the system bus of the time split transfer system from the reception side unit. Thus, the unit for processing data of an arbitrary data width within a data width of the system bus of the time split transfer system can be interconnected to the system bus of the time split system.

Finally, an embodiment the present invention for achieving the third object assumes a multi-processor system in which an input and output unit, a plurality of processor units and a shared memory commonly utilized by the plurality of processor units are interconnected to the system bus. Furthermore, the input and output unit and the plurality of processor units include individual identifiers and shared memories for reading in the identifier transmitted on the system bus to thereby determine their own access.

The bus interface for connecting the input and output unit to the system bus determines on the basis of the address value transmitted on the internal bus whether the access is to the shared memory or to the local memory within one of the plurality of processor units. When the bus interface determines that the access is to the shared memory, it accesses the shared memory at its address corresponding to the address value. When the bus interface determines that the access is to the arbitrary processor unit, it accesses the arbitrary processor unit at its local memory corresponding to the address value.

In a preferred embodiment of the present invention, the bus interface of the input and output unit includes first memory means for storing the upper or lower limit of the address of the shared memory, and comparing means for comparing the address stored in the first memory means with an address transmitted on the internal bus, wherein it is determined on the basis of a compared result of the comparing means whether the access is to the shared memory or to the local memory within the arbitrary processor unit.

At that time, the first memory means stores the upper limit of the address of the shared memory and the bus interface determines that the access is to the shared memory when the comparing means outputs a compared result indicating that the address transmitted on the internal bus is smaller than the address stored in the first memory means and determines that the access is to the local memory within the arbitrary processor unit when the comparing means outputs a compared result indicating that the address transmitted on the internal bus is larger than the address stored in the first memory means.

In another preferred embodiment of the present invention, the bus interface of the input and output unit is comprised of second memory means in which the identifier of the shared memory is stored, third memory means in which the identifiers of the plurality of processor units are stored, and selecting means for selecting the identifier stored in said second memory means and the identifier of an arbitrary processor unit of the plurality of processor units stored in the third memory means. When a unit body section of the input and output unit accesses the shared memory, the shared memory identifier stored in the second memory means is output to the system bus by the selecting means, and when the unit body section of the input and output unit accesses the arbitrary processor unit, the identifier stored in the third memory means and corresponding to the arbitrary processor unit is output to the system bus by the selecting means, thereby accessing the shared memory or the local memory of the plurality of processor units.

In this arrangement, the input and output unit can access not only the shared memory but also the local memory of the arbitrary processor unit in the plurality of processor units interconnected to the system bus via the bus interface.

BRIEF DESCRIPTION OF THE DRAWINGS

A better understanding of the objects, features and advantages of the invention can be gained from the following detailed description of the preferred embodiments, in conjunction with the accompanying drawings, wherein:

FIG. 14 is a schematic block diagram showing an arrangement of memory spaces which can be accessed by respective processor units;

FIG. 15 is a circuit block diagram of respective processor units and bus interfaces within an input and output unit according to the prior art;

FIGS. 21A to 21D are diagrams showing, respectively, formats of command, answer, reception control buffer and transmission control buffer;

DETAILED DESCRIPTION OF THE PREFERRED EMBODIMENTS

Figure 16:
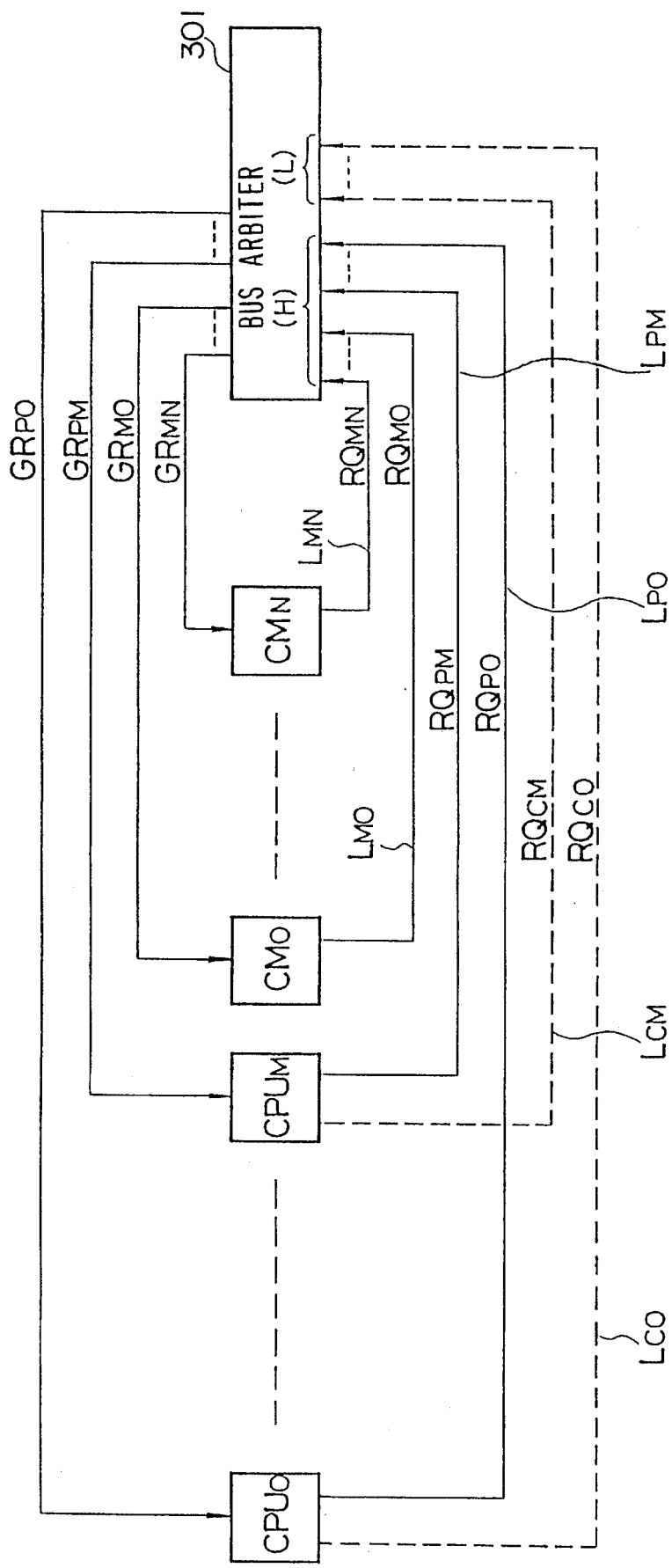
FIG. 16 is a block diagram showing a multi-processor system according to a first embodiment of the present invention.

The preferred embodiments of the present invention will hereinafter be described with reference to the accompanying drawings. FIG. 16 is a block diagram showing an arrangement of a multi-processor system according to a first embodiment of the present invention.

As shown in FIG. 16, CPU boards $CPU_0$ to $CPU_N$ and a bus arbiter 301 are interconnected by command transfer request signal lines $L_{C0}$ and $L_{CM}$ through which command transfer request signals RQci (i= 0, 1, . . . , M) are transmitted and answer transfer request signal lines $L_{P0}$ to $L_{PM}$ through which answer transfer request signals RQpi (i= 1, 2, . . . , M) are transmitted. Also, memory boards $CM_0$ to $CM_N$ and the bus arbiter 301 are interconnected by answer transfer request signal lines $L_{M0}$ to $L_{MN}$ through which the answer transfer request signals $RQ_{Mj}$ from the memory boards CMj (j= 1, 0, . . . , N) are transmitted, and the bus arbiter 301 and the respective boards are interconnected by signal lines GRpi (i= 0, 1, . . . , M) and $GR_{Mj}$ (j= 0, 1, . . . , N) through which a transfer permission signal GR is transmitted.

In this embodiment, a high [H] level signal is assigned to the answer transfer request signals RQpi and $RQ_{Mj}$ and also a high [H] level signal is assigned to the command transfer request signal RQci, whereby the bus arbiter 301 recognizes the answer transfer request or the command transfer request by detecting whether the transfer request signal is at high or low level.

Figure 17:
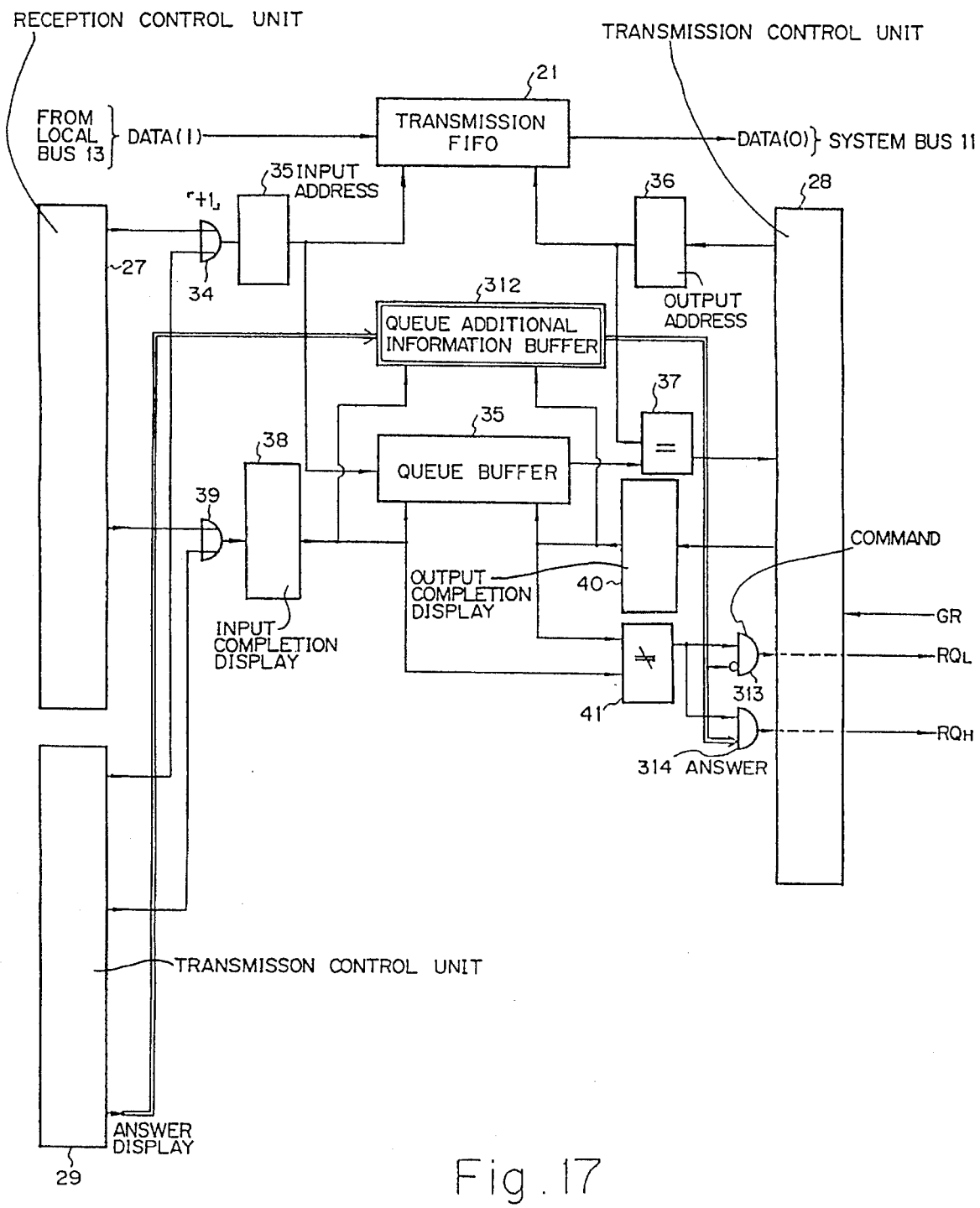
FIG. 17 is a circuit block diagram of a bus interface of each board in the first embodiment of the present invention.

FIG. 17 is a block diagram of a circuit arrangement of a bus interface within a CPU board CPUi and a memory board CMj.

Figure 1:
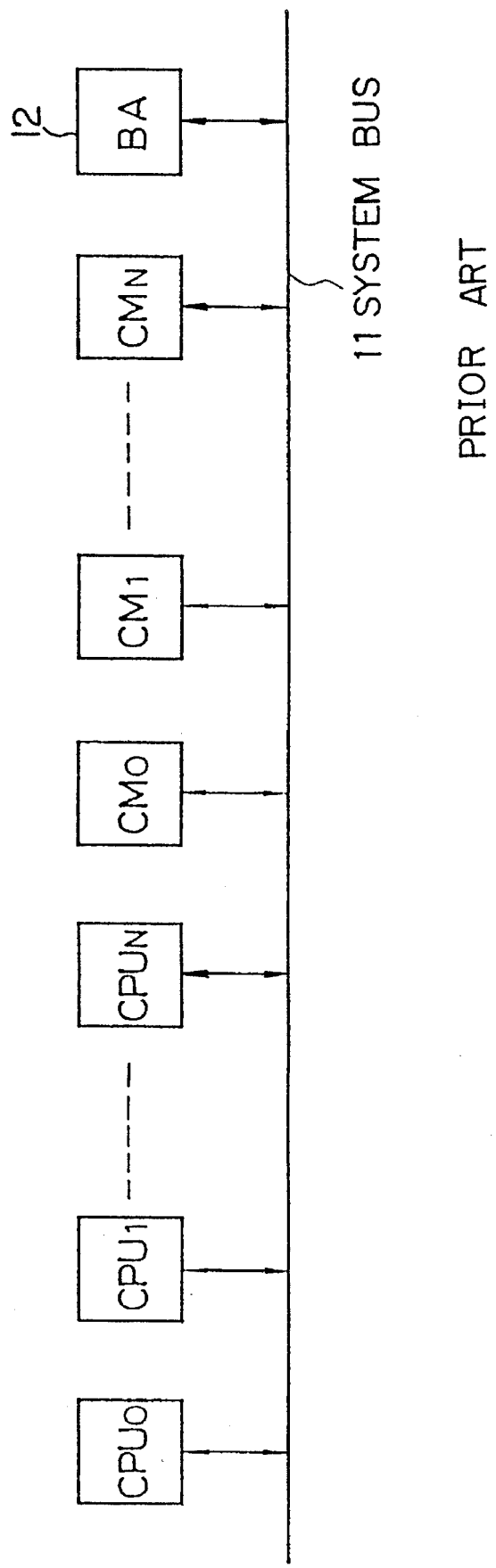
FIG. 1 is a schematic block diagram showing an arrangement of a general multi-processor system.
Figure 2A:
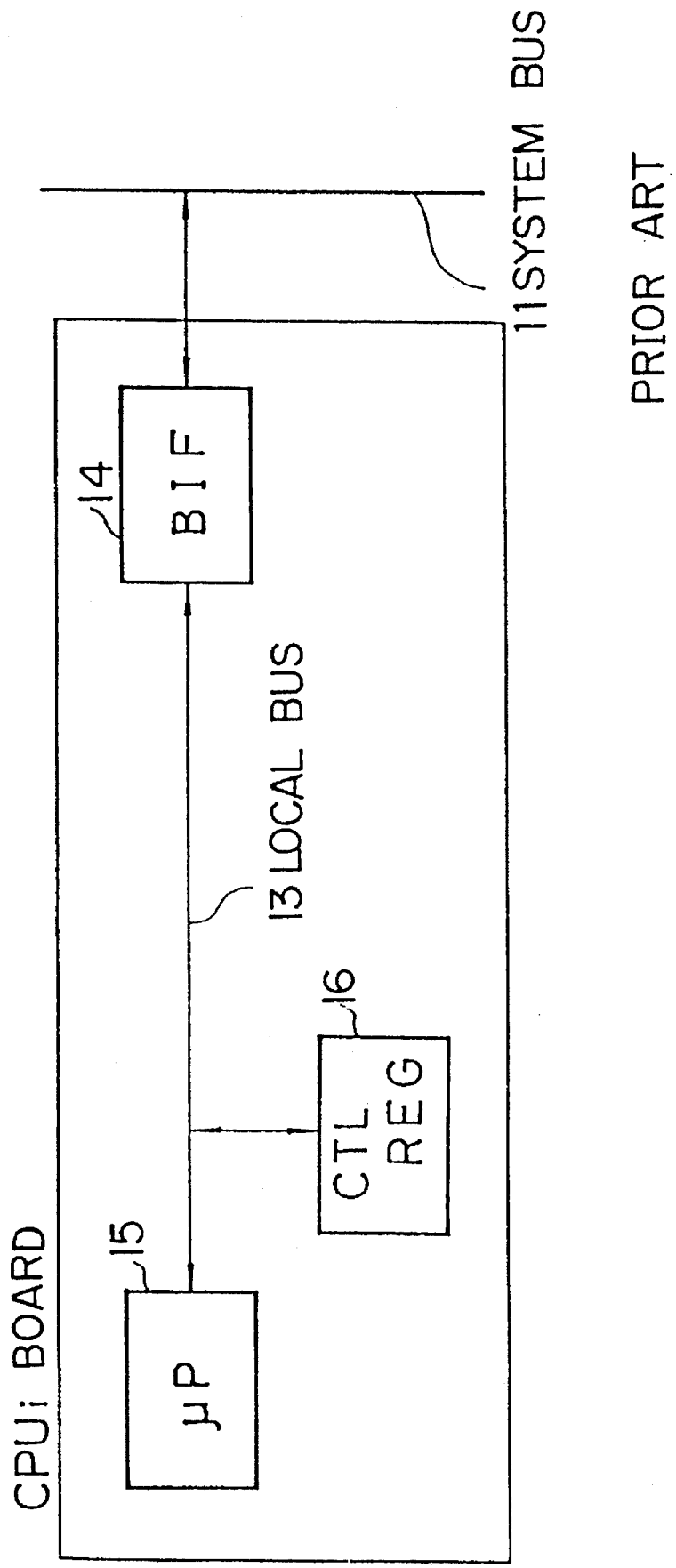
FIG. 2A is a schematic block diagram showing an arrangement of a general CPU board.
Figure 2B:
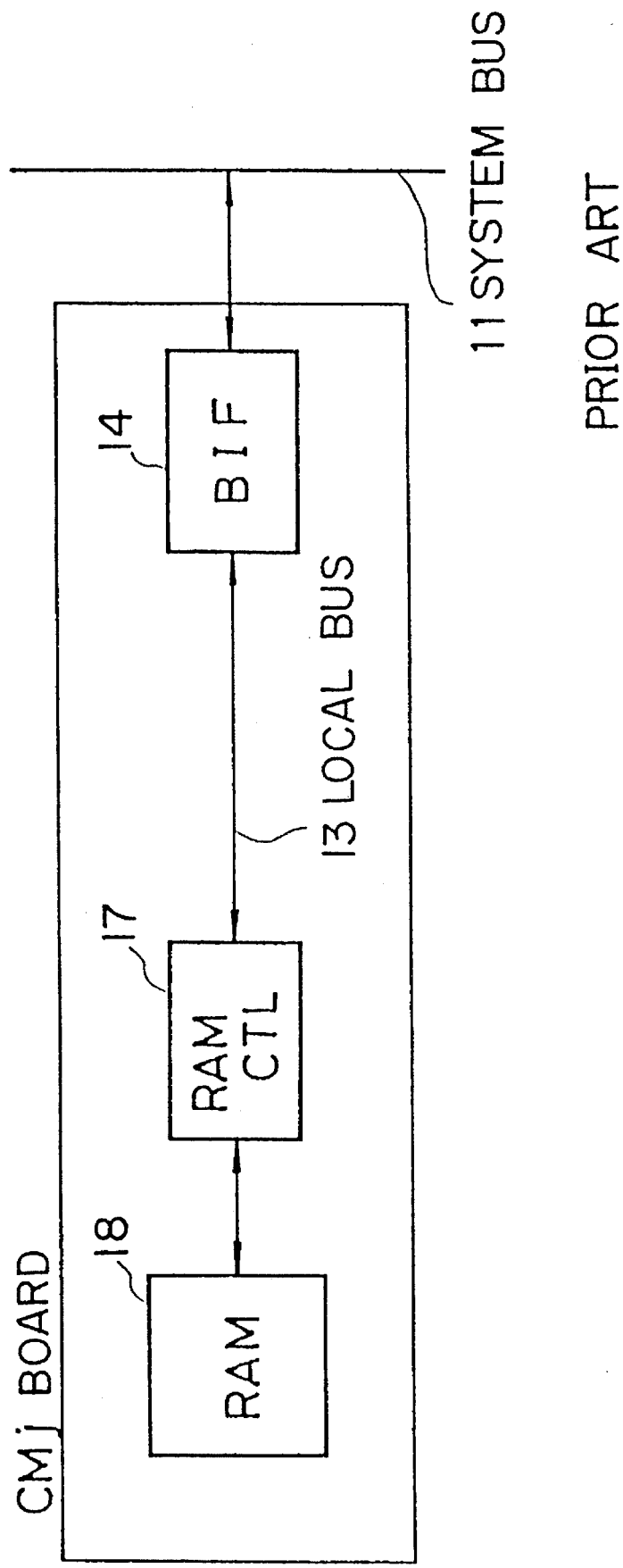
FIG. 2B is a schematic block diagram showing an arrangement of a general memory board.
Figure 3:
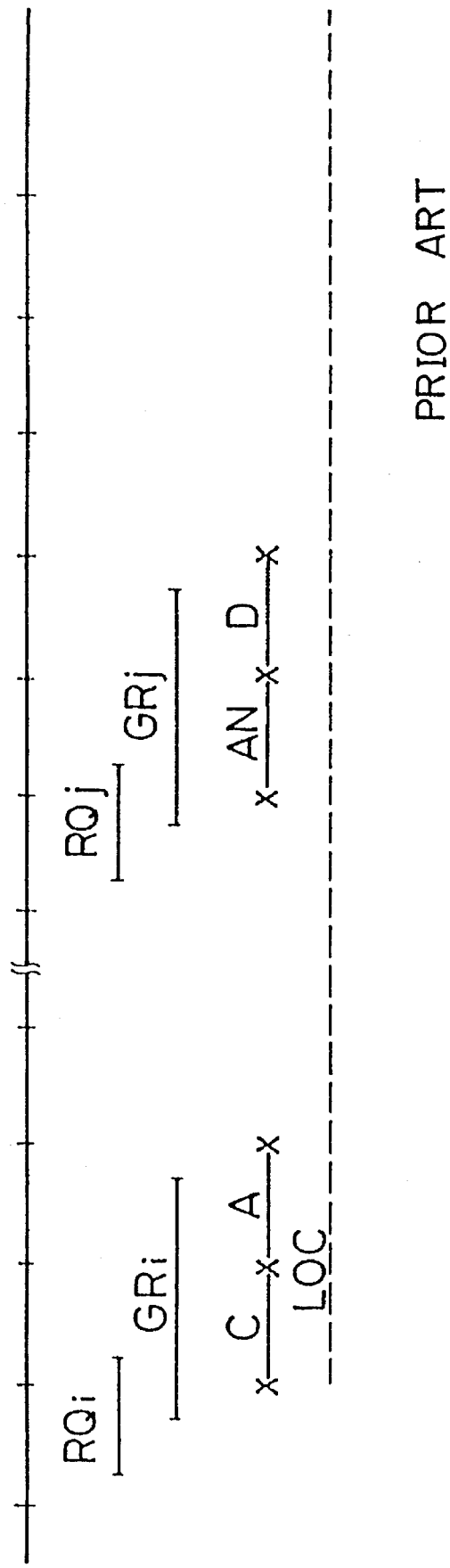
FIG. 3 is a diagram showing an example of a timing at which a command and an answer are transmitted in a system bus of a time split system.
Figure 4:
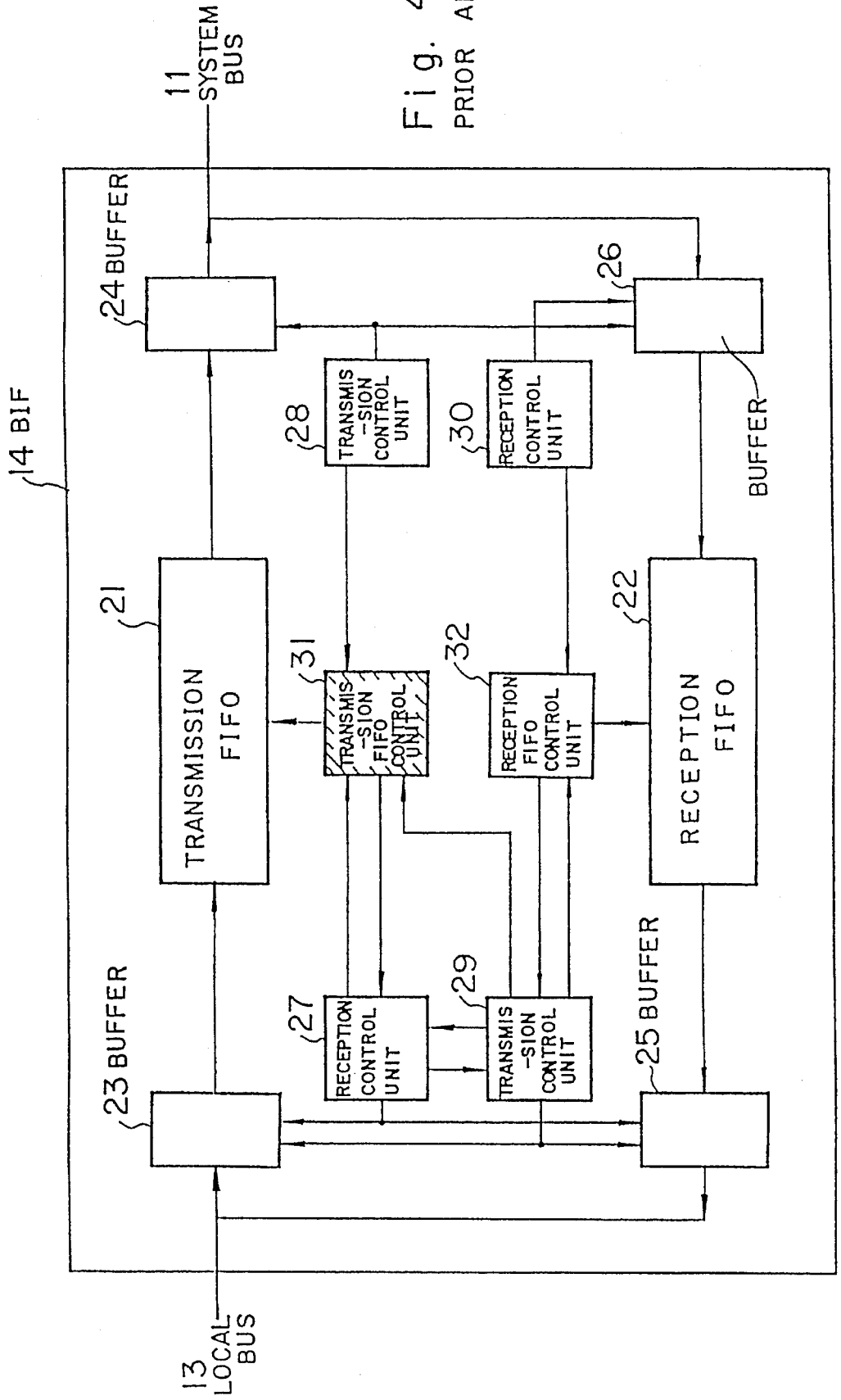
FIG. 4 is a schematic block diagram showing an arrangement of a bus interface according to the prior art.
Figure 5:
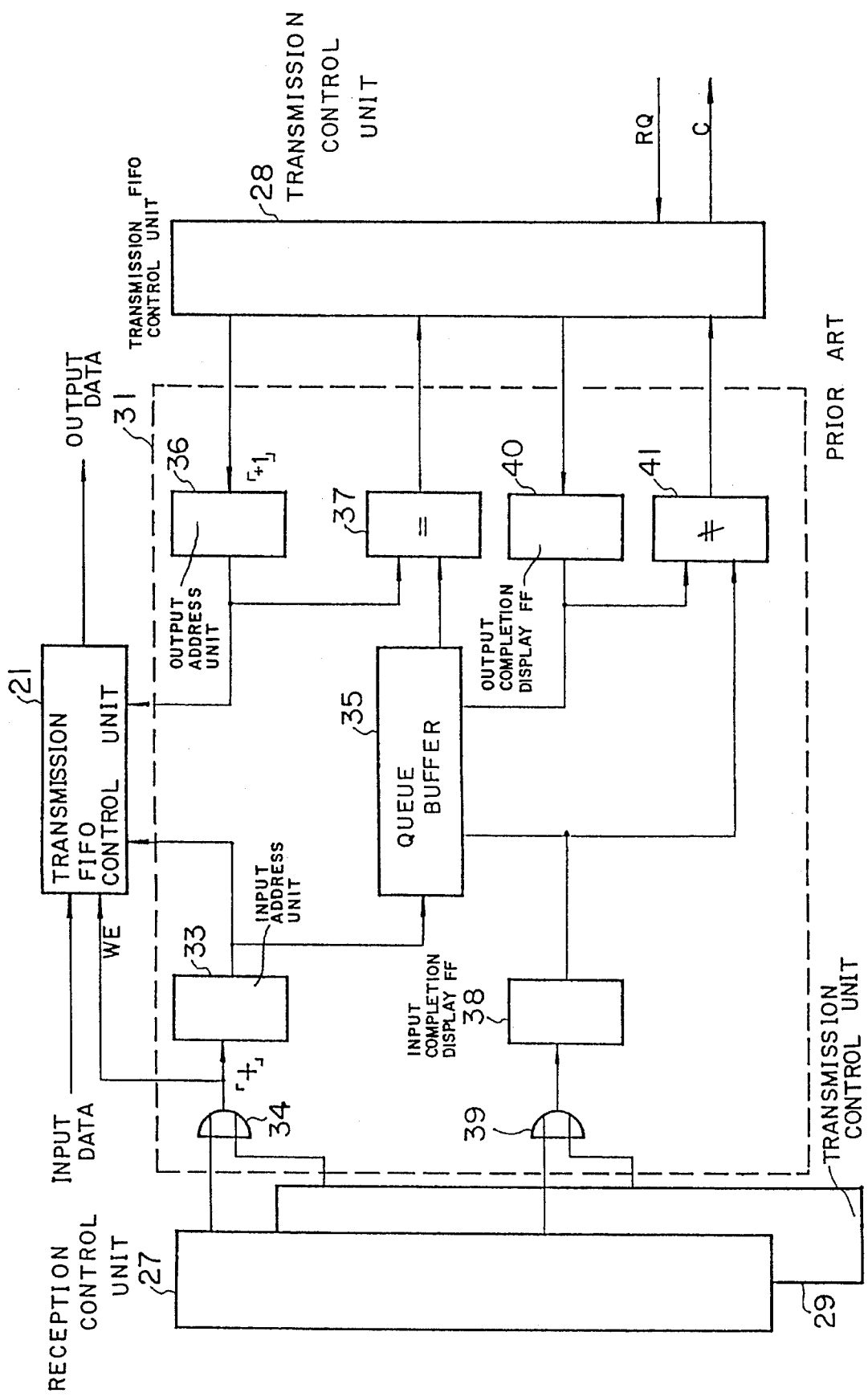
FIG. 5 is a circuit block diagram showing in more detail the transmission FIFO control unit shown in FIG. 4.
Figure 6:
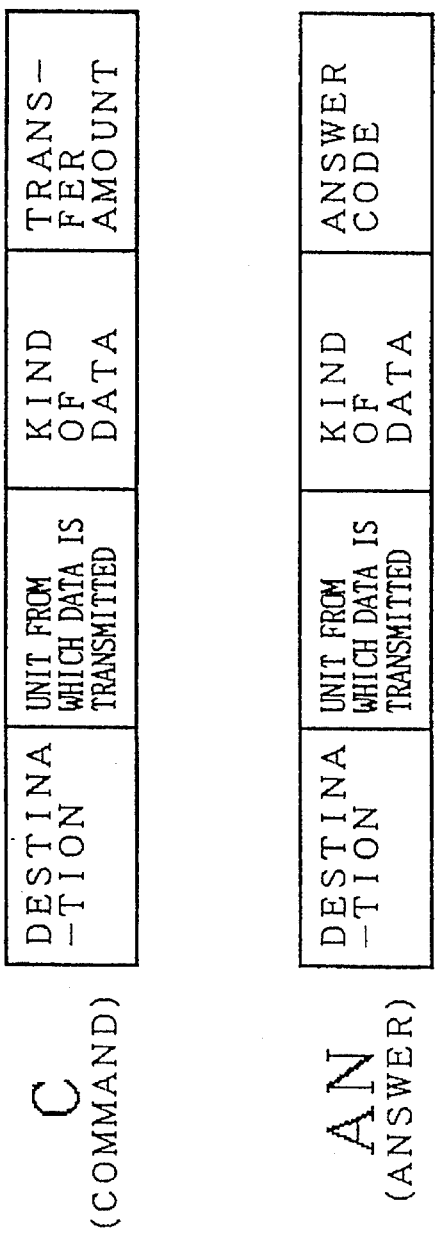
FIG. 6 is a diagram of formats of command and answer used in lock transfer.
Figure 7:
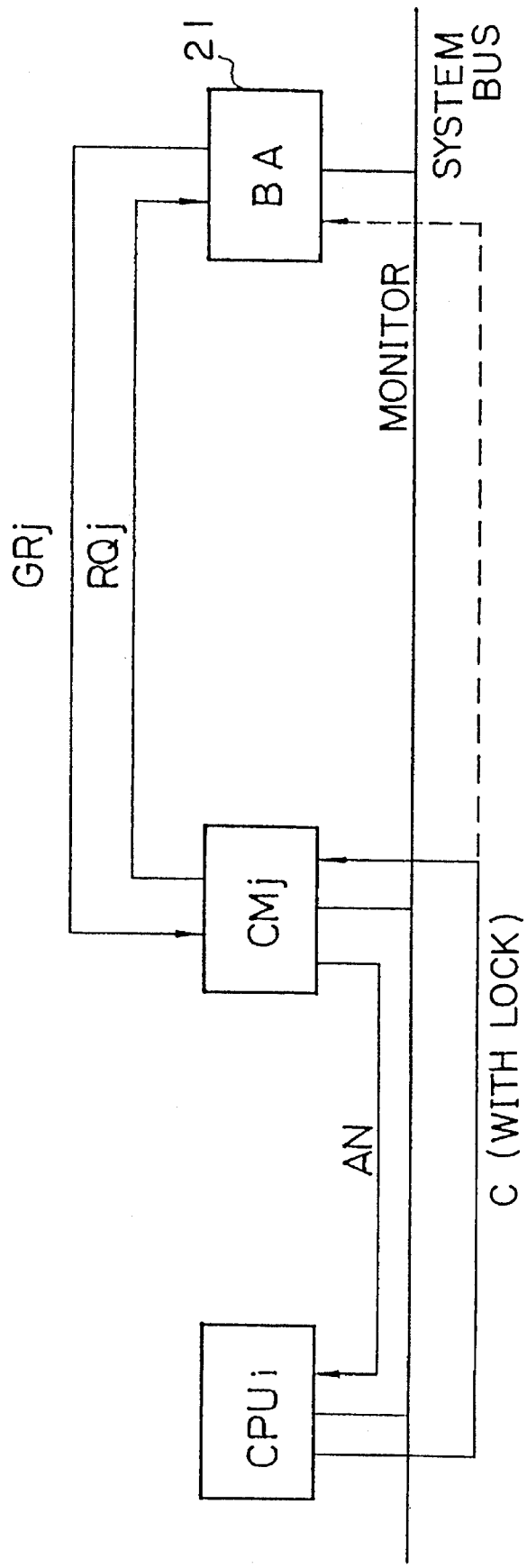
FIG. 7 is a schematic block diagram used to explain the lock transfer operation.
Figure 8:
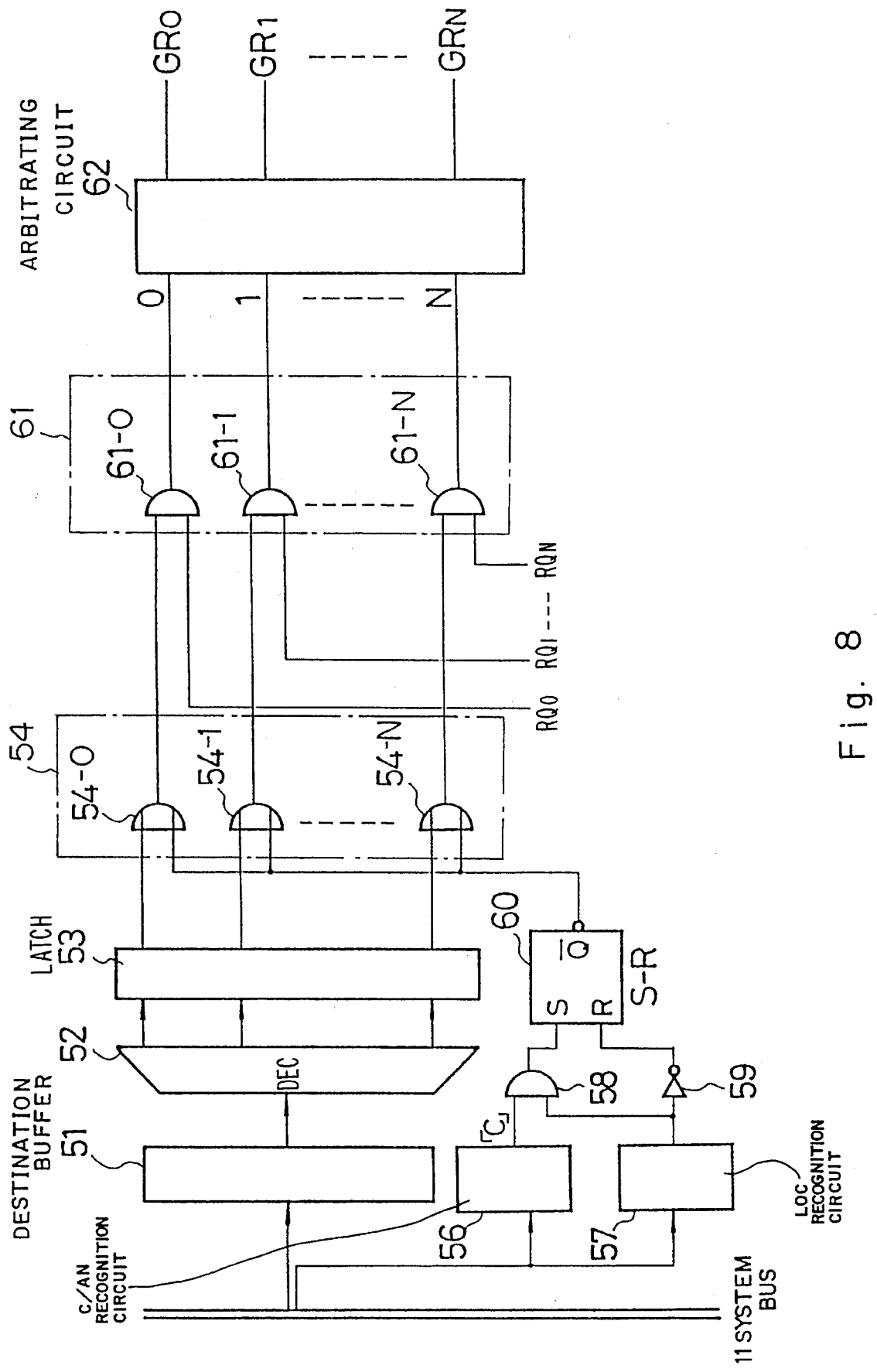
FIG. 8 is a circuit block diagram showing a main portion of a conventional bus arbiter.
Figure 9:
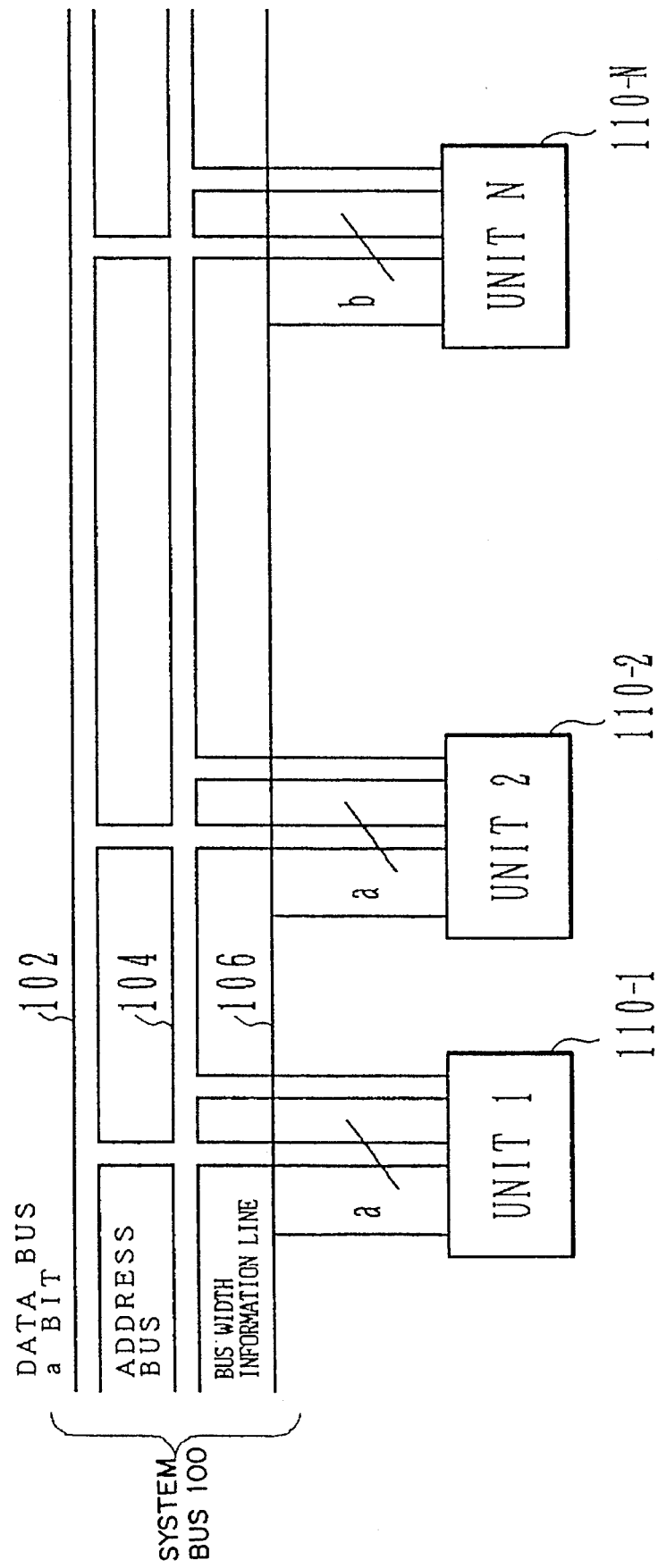
FIG. 9 is a block diagram showing an arrangement of a multi-processor system which utilizes a system bus other than the system bus of the time split transfer system.
Figure 10:
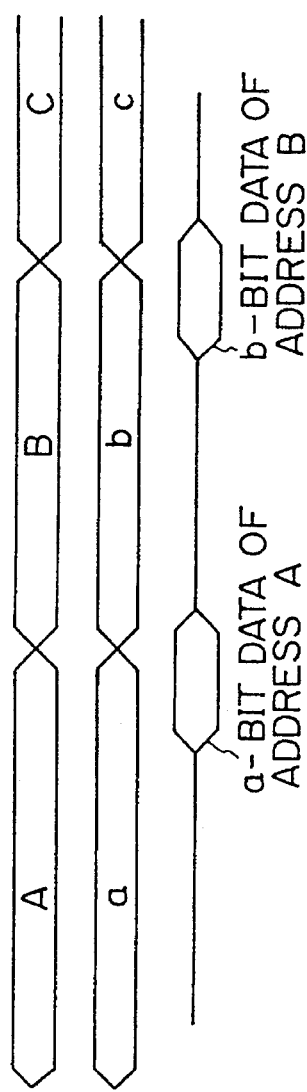
FIGS. 10A to 10C are schematic diagrams used to explain the data transfer operation of the system bus in the multi-processor system shown in FIG. 9.
Figure 11:
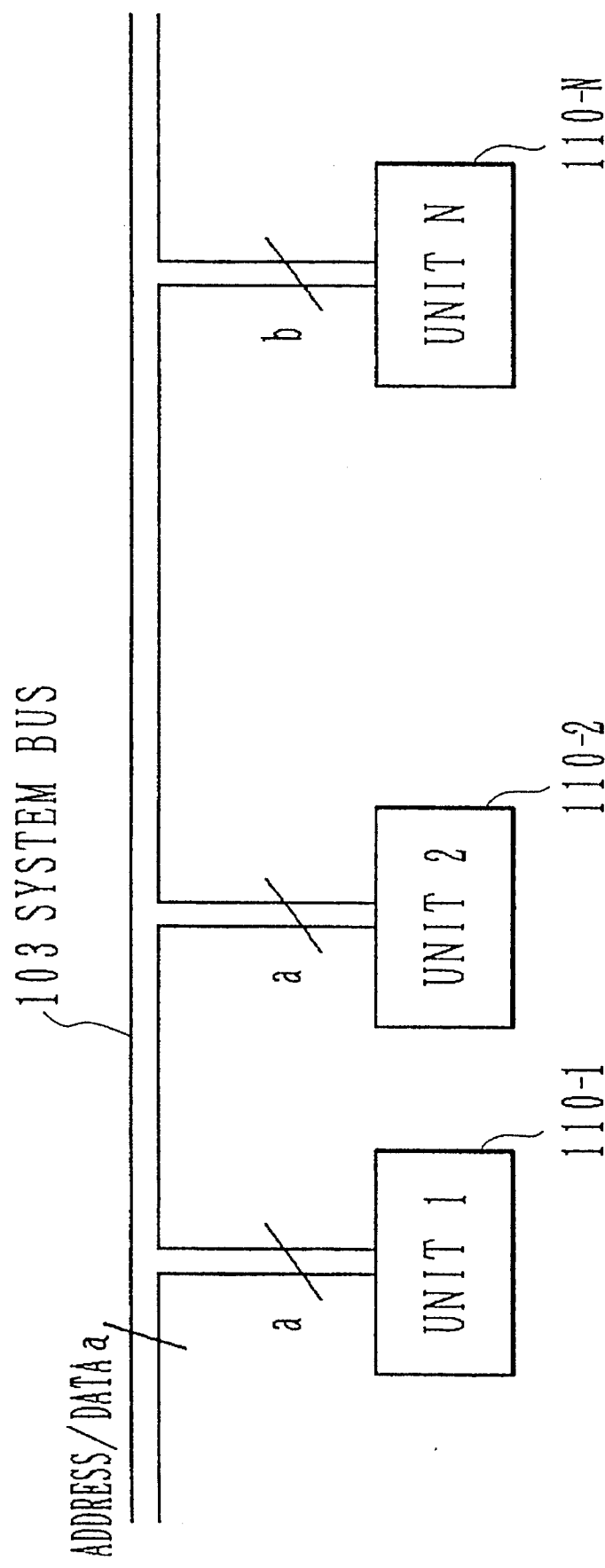
FIG. 11 is a schematic block diagram showing an arrangement of a multi-processor system utilizing a system bus of the time split transfer system.
Figure 12:
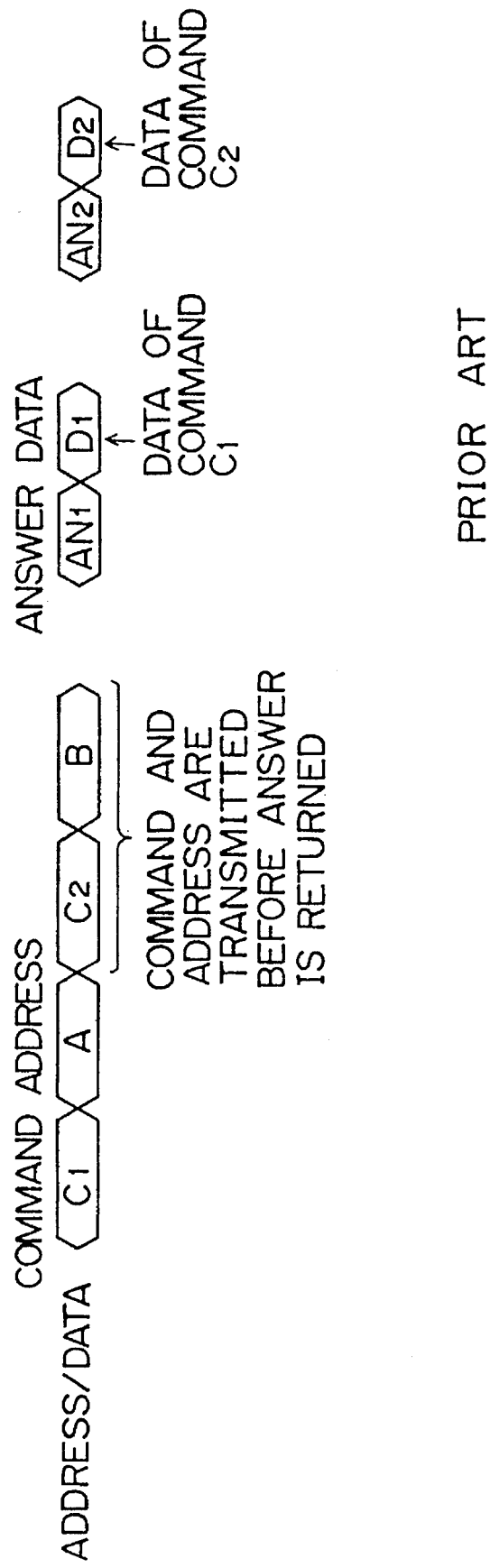
FIG. 12 is a schematic diagram used to explain data transfer operations in the multi-processor system shown in FIG. 11.

FIG. 17 shows the circuit mainly as relating to transmission. The same circuit block as in of the conventional bus interface (FIGS. 4 and 5) are marked with the same reference numerals and need not be described.

As shown in FIG. 17, a queue additional information buffer 312 is provided to store information indicating the status of the transfer request signal, or whether the transfer request signal is the command transfer request or the answer transfer request.

An output of the queue additional buffer 312 is input directly to an AND gate 313 and also in the inverted signal form. These AND gates 313 and 314 are supplied at the other input terminals with a compared output of comparator 41 which detects the presence or absence of data which is not yet transferred. If data to be transferred still remains, a signal corresponding to the queue additional information is output to the transmission control unit 28. When the queue additional information is, for example, the answer transfer request, both inputs of the AND gate 314 are enabled and an output thereof becomes high level. In response to the high level output of the AND gate 314, the transmission control unit 28 transmits the answer transfer request signal $RQ_H$ to the answer transfer request signal lines Lpi and Lpj.

When the queue additional information is the command transfer request, both inputs of the AND gate 313 are enabled and the output thereof goes to high level, whereby the transmission control unit 28 transmits a command transfer request signal $RQ_L$ of high level to the command transfer request signal line Lci.

Thus, the bus arbiter 301 can recognize the answer transfer request or the command transfer request by determining whether the transfer request signal is at high level or low level.

Further, since the queue additional information buffer 312 stores the queue additional information indicative of any one of the command transfer requests or answer transfer requests at every breakpoint of the data row stored in the transmission FIFO 21, the content of the transfer request can be analyzed within a short interval.

Figure 18:
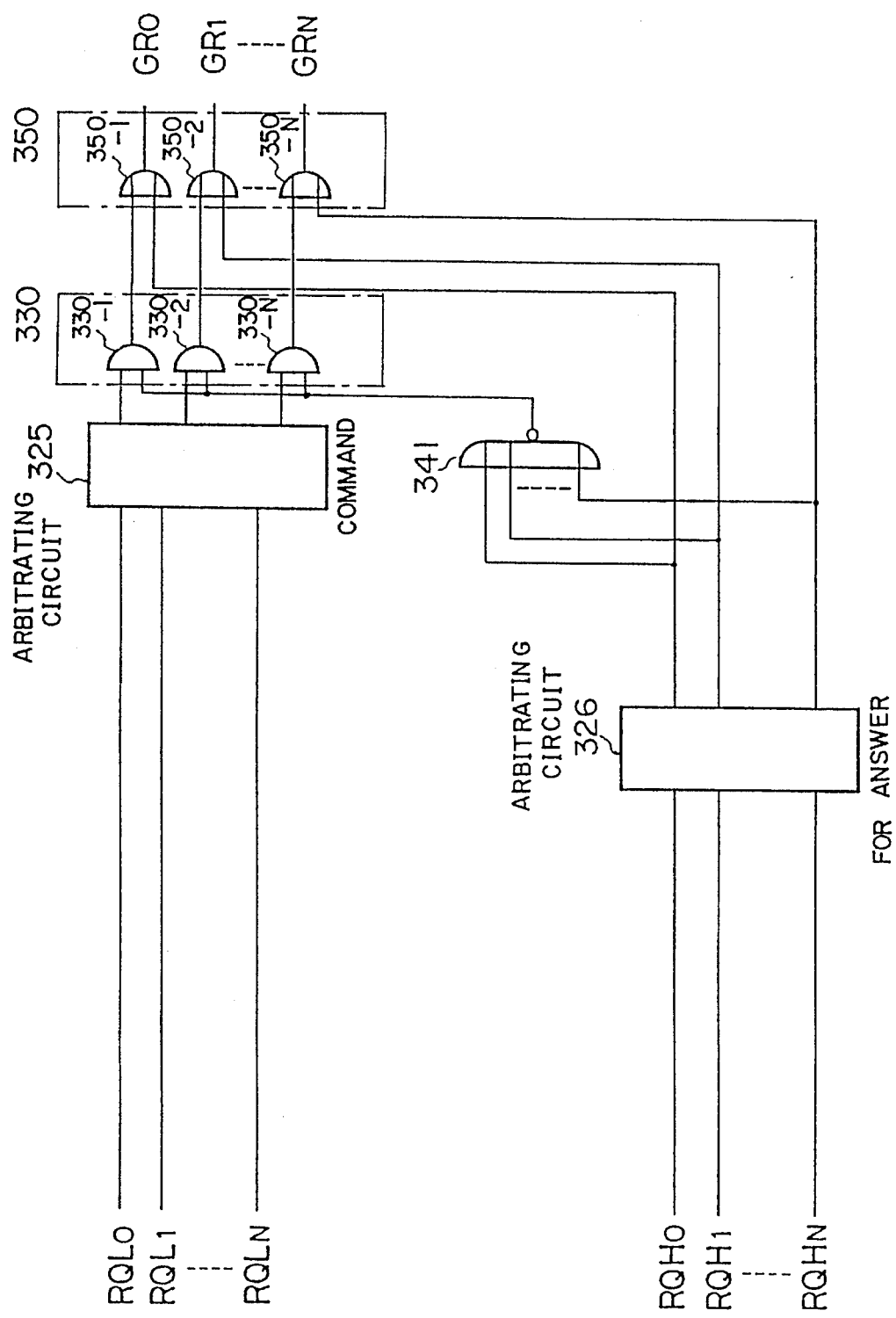
FIG. 18 is a circuit block diagram showing a bus arbiter in the first embodiment of the present invention.

FIG. 18 is a block diagram showing an example of an arrangement of the bus arbiter 301.

As shown in FIG. 18, command transfer requests $RQL_0$ to $RQL_N$ ($RQ_{C0}$ to $RQ_{CM}$) of low priority level and answer transfer requests $RQH_0$ to $RQH_N$, to ($RQ_{P0}$ to $RQ_{PM}$, $RQ_{M0}$ to $RQ_{MN}$) from the respective boards are input to the bus arbiter 301.

Arbitrating circuits 325 and 326 are provided to determine the priority in processing the command transfer request $RQL_i$ and the answer transfer requests $RQH_i$ and $RQH_j$ from the respective boards. The arbitrating circuits 325 and 326 store the priority orders assigned to the respective boards, and when a plurality of boards simultaneously output the answer transfer requests and the command transfer request, the arbitrating circuits 325 and 326 output the high-level signal from the output terminals corresponding to the high priority boards.

Respective outputs of the command arbitrating circuit 325 are input to an AND gate group 330 and respective outputs of the answer arbitrating circuit 326 are input to a multi-input NOR gate 341 and an OR gate group 350.

Let it now be assumed that a plurality of command transfer requests and a plurality of answer transfer requests are simultaneously inputted to the bus arbiter 301. Then, the command arbitrating circuit 325 and the answer arbitrating circuit 326 output high-level signals from their output terminals corresponding to the highest-priority boards in the respective command and answer requests. At that time, due to the output of the answer arbitrating circuit 326, one input of the NOR gate 341 goes to high level so that the output of the NOR gate 341 goes to low level, causing one input terminals of all AND gates 330-i of the AND gate group 330 to go to low level.

Consequently, the command transfer request input to the AND gate group 330 is ignored and the transfer permission signals GRi, GRj are output to the highest-priority board which outputs the answer transfer request.

Further, at that time, if there is another answer transfer request, the output of the NOR gate 341 similarly goes to low level so that the transfer permission signal is output with priority to the answer transfer request.

Since the command transfer request signal line RQci, the answer transfer request signal lines Lci and Lcj, and the arbitrating circuits 325 and 326 corresponding individually to these request signal lines are provided as described above, the command transfer request and the answer transfer request are discriminated and transmitted to the bus arbiter 301 from the respective boards. Thus, the two request signals can be discriminated from each other by the bus arbiter 301.

Further, since the two signals can be discriminated, the answer transfer request can be processed with higher priority. In addition, these functions can be realized with a bus interface and bus arbiter with simpler circuit arrangements than the conventional bus interface and bus arbiter.

Therefore, since the answer is immediately returned to the CPU board CPUi which issues the command, it becomes possible to reduce the time during which the CPU board CPUi is set in the answer awaiting condition. As a result, a local bus placed in the inter-lock system can be more effectively utilized to enhance the processing efficiency of each board.

Further, when a lock transfer is carried out in the prior art, a transfer request from another board is neglected. Therefore, the bus arbiter must include a circuit for recognizing a board to which the lock transfer is addressed and a circuit for receiving only the answer request from that board. These circuits are not needed in the present invention. More specifically, the answer transfer request is processed with a priority such that, if the lock transfer is carried out only on the command transfer request and an exclusive control is performed, then the answer transfer request can be processed while the bus utilization right between the CPU board which outputs the lock transfer command and the destination board is maintained.

The CPU boards and the memory boards described in this embodiment are not limited to microprocessors or boards having memories. The present invention can also be applied to an exclusive control in a large scale system in which a system formed of a plurality of boards is considered as one processing apparatus and a plurality of the above-mentioned processing apparatuses are interconnected to a network or an upper class bus.

As described above, according to the present invention, the answer transfer request is processed with higher priority to the command transfer request by a simply arranged bus interface and bus arbiter. Thus, even when the system bus is utilized by the data transfer system of the time split transfer system, the time during which the CPU board which outputs the command is set in the answer waiting condition can be reduced and the processing efficiency of the system can be increased.

A second embodiment of the present invention is described next.

Figure 19:
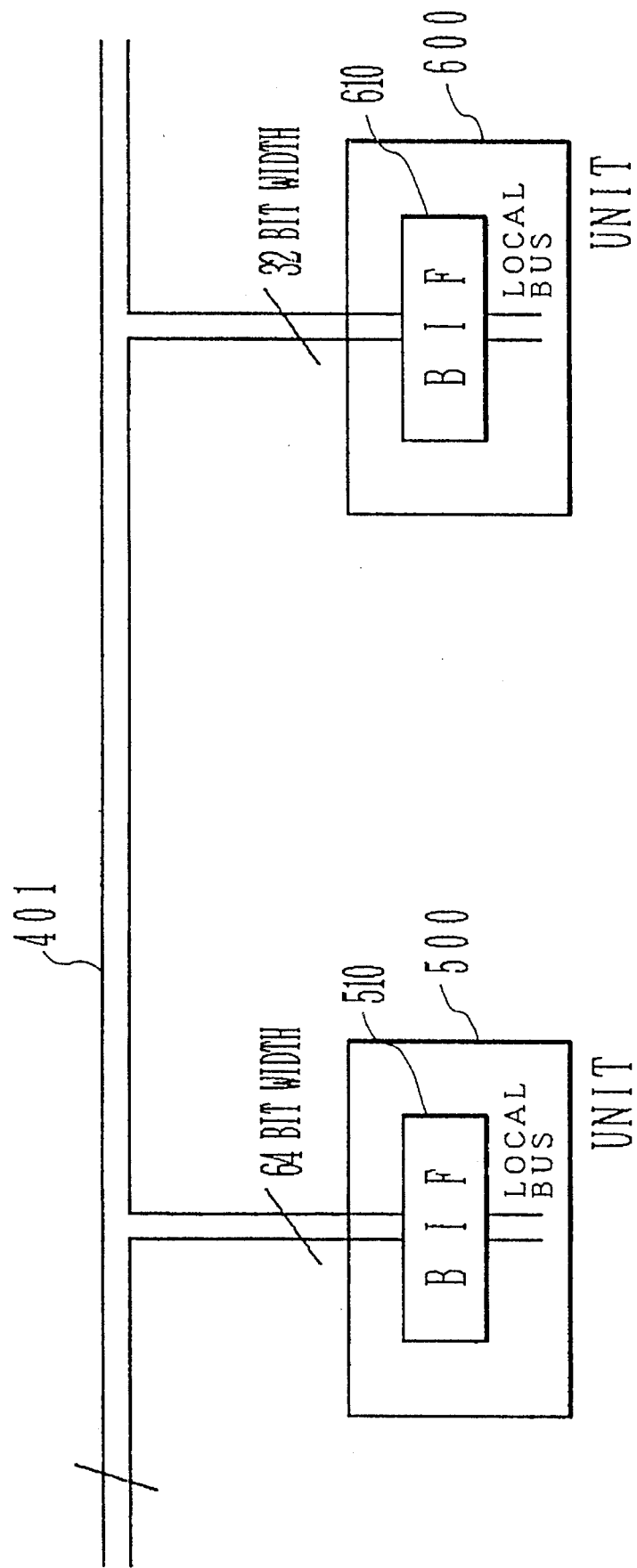
FIG. 19 is a schematic block diagram showing an arrangement of the multi-processor system according to the second embodiment of the present invention.

FIG. 19 is a schematic block diagram showing one portion of an arrangement of a multi-processor system according to the second embodiment of the present invention.

As shown in FIG. 19, a unit 500 and a unit 600 are connected to a system bus 401 formed of an address bus and a data bus via bus interfaces (BIFs) 510 and 610 which are respectively provided within the units. The unit 500 transmits and receives 64-bit-wide data to and from another unit through the system bus 401, and the unit 600 transmits and receives 32-bit-wide data to and from another unit through the system bus 401.

Figure 20:
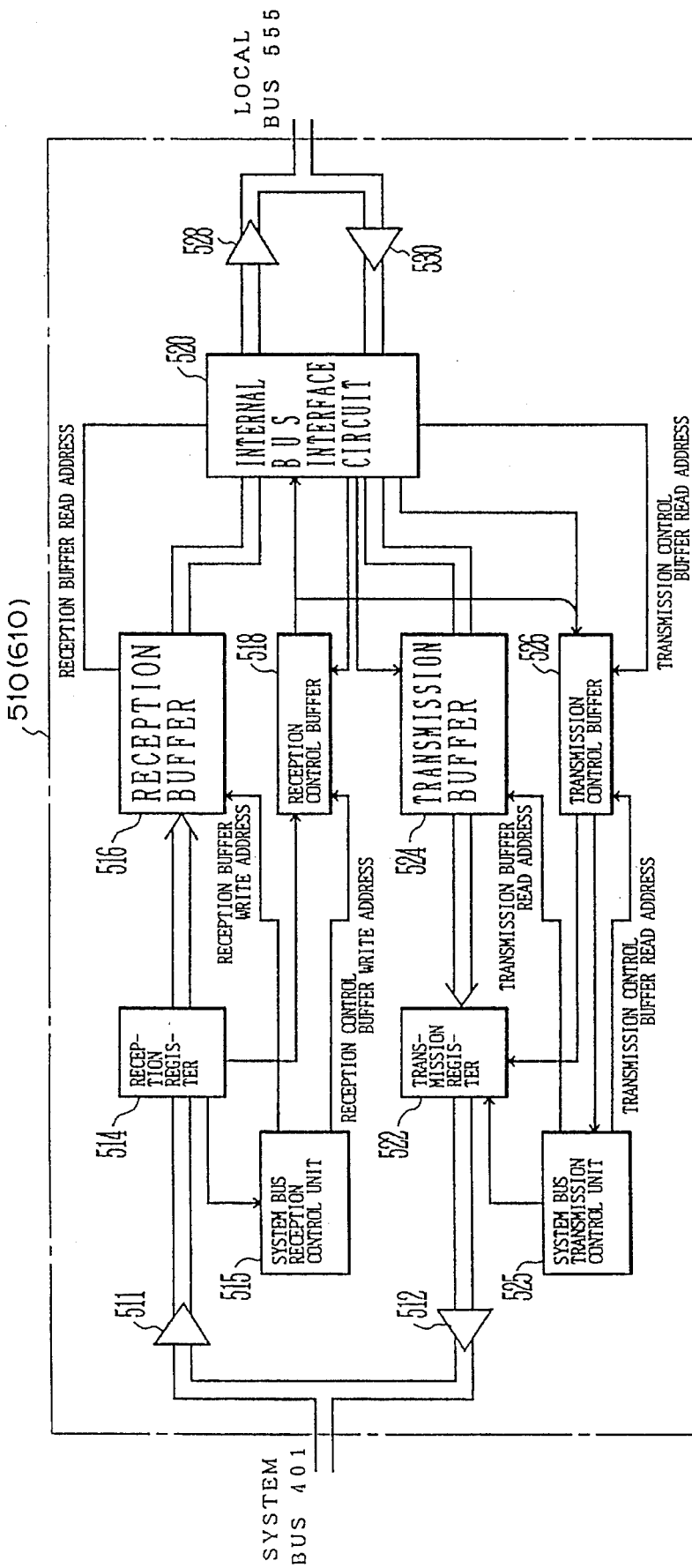
FIG. 20 is a block diagram showing a circuit configuration of the bus interface in the second embodiment of the present invention.

The bus interfaces 510 and 610 within the units 500 and 600 have the same circuit arrangement, and FIG. 20 shows a block circuit diagram of the bus interfaces 510 (610).

As shown in FIG. 20, the bus interface 510 (610) is composed of a receiver 511, a driver 512, reception register 514, a system bus reception control unit 515, a reception buffer (BF) 516, a reception control buffer (RSB) 518, an internal bus interface circuit 520, a transmission register 522, a transmission buffer (SB) 524, a system bus transmission control unit 525, a transmission control buffer (SSB) 526, a driver 528 and a receiver 530. The receiver 511 and the driver 512 are connected to the system bus 401 of the time split system, and the driver 528 and the receiver 530 are connected to a local bus 555.

The reception register 514 is a register which temporarily stores a command, data or the like transmitted from other units and received from the system bus 401 through the receiver 511, and the received data is output to the reception buffer 516.

The system bus reception control unit 515 contains a counter. Each time reception data is stored in the reception register 514, the unit 515 increments the counter by one and supplies the count value to the reception buffer 516 as a reception buffer write address. Also, the system bus reception control unit 515 generates a reception control buffer write address into which reception control data (described later) is written and supplies this data to the reception control buffer 518.

The reception control buffer 518 stores informations necessary to control received data. This information includes a pointer indicating the starting position of received data, the kind of command, data length (bytes) of received data and so on, which will be stored in the reception buffer 516 as will be described more fully later. The reception control information is utilized when the local bus interface circuit 520 transmits data stored in the reception buffer 516 through the driver 528 to the local bus 555.

The local bus interface circuit 520 also writes local data input through the receiver 530 to the local bus 55 in the transmission buffer 524. It also generates an answer to be transmitted to another unit via the system bus 401.

The transmission buffer 524 temporarily stores data to be transmitted to another unit, and this data is written by the local bus interface circuit 520. The transmission control buffer 526 has a function fundamentally similar to that of the reception control buffer 518 and stores therein information necessary to control the transmission data stored in the transmission buffer 524, as described more fully later.

The system bus transmission control unit 525 transmits data stored in the transmission buffer 524 through the transmission register 522 and the driver 512 to the system bus 401 on the basis of the transmission control information stored in the transmission control buffer 526.

Formats of the command C and the answer AN transmitted by each unit through the system 401 to another unit and formats of control information written in the reception control buffer 518 and the transmission control buffer 526 are represented in FIGS. 21A, 21B 21C and 21D, respectively.

The command C is formed of a destination unit number DU, a sending unit number SU, bus width information BW, read/write information RW and so on as shown in FIG. 21A. The answer AN is composed of a destination unit number DU, a sending unit number SU, bus width information BW and so on as shown in FIG. 21B.

As described above, the command C and the answer AN both include the bus width information BW. Thus, when transmitting the command C, the transmitting side unit can let the receiving side know the bit width of the data transmitted by its own unit. Also, when transmitting the answer AN, the unit which receives the command C can let the unit which transmits the command C know the bit width of data transmitted by its own unit through the system bus 401.

The reception control information that the reception control buffer 518 generates for every piece of data written in the reception buffer 516 is composed, as shown in FIG. 21C, of a pointer P indicating the starting position of reception data in the reception buffer 516, read/write information R/W indicating the kind of reception data, bus width information BW indicating bit width of reception data, a byte number indicating data length of reception data, a sending unit number SU indicating the number (ID) of the unit which transmits the reception data and so on.

The transmission control information that the transmission control buffer 526 generates for every piece of data written in the transmission buffer 524 is composed of, for example, a pointer P indicating a starting position of transmission data within the transmission buffer 524, bus width information BW indicating bit width of transmission data, a byte number bit BT indicating data length of transmission data, etc.

Figure 22:
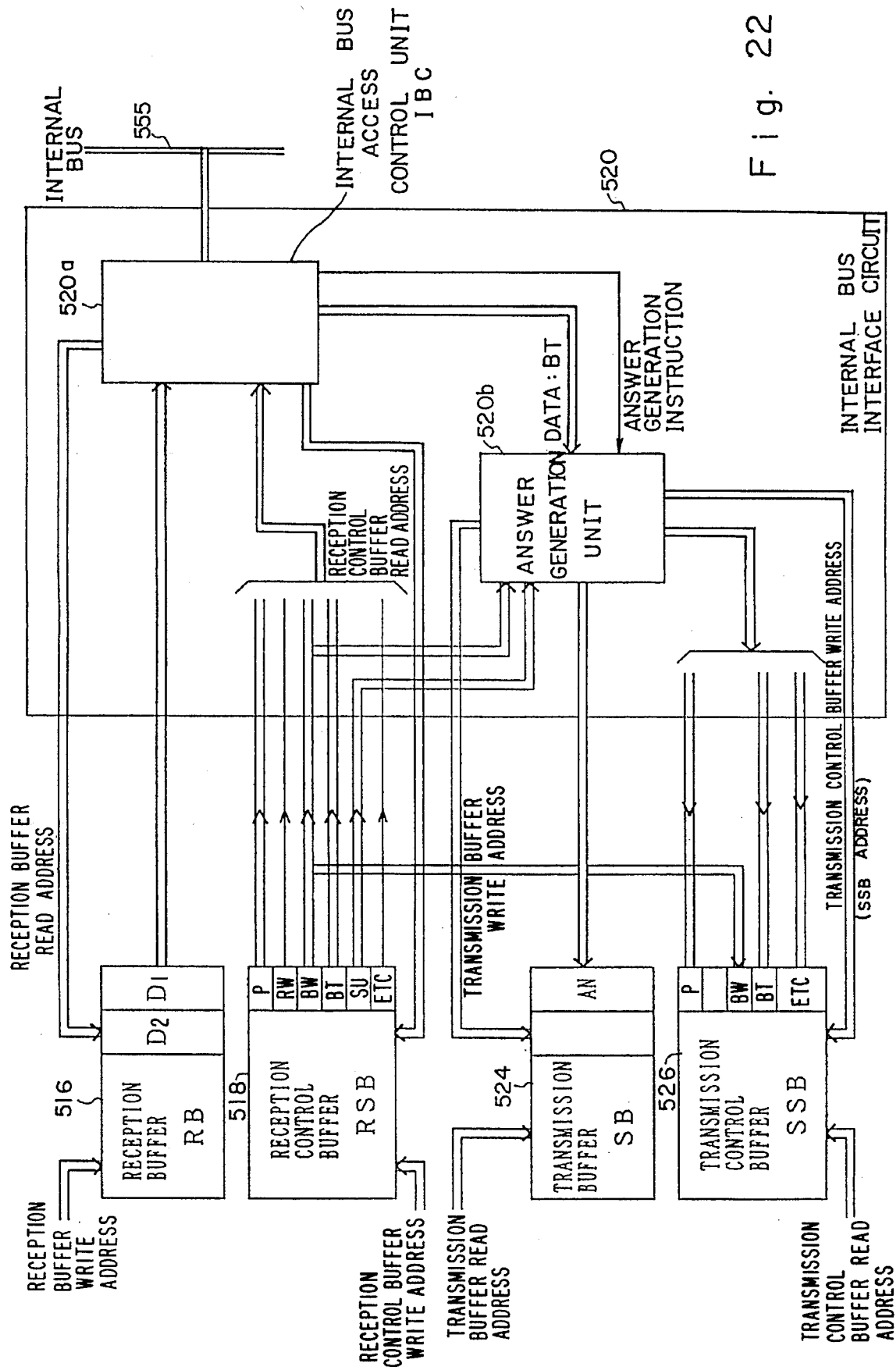
FIG. 22 is a block diagram showing in more detail a portion relating to the main portion of the present invention within the bus interface circuit used in the second embodiment.

FIG. 22 shows more fully a main portion of the bus interface circuit 510 (610) which relates to the present invention.

As shown in FIG. 22, an internal bus interface circuit 520 is composed of an internal bus access control unit (IBC) 520a and an answer generation unit 520b.

The internal bus access control unit 520a supplies a reception control buffer read address to the reception control buffer 518 to read out from the reception control buffer 518 the reception control information of the format shown in FIG. 21B. Then, the internal bus access control unit 520a reads out individually $D_1$, $D_2$, ... from the reception buffer 516 with reference to the pointer P within the reception control information. The internal bus access control unit 520a transmits the thus read-out reception data $D_1$, $D_2$, ... formed by the command C, etc. having the format shown in FIG. 21A to the local bus 555. Also, the internal bus access control unit 520a is supplied with response data to the command C through the local bus 555 and outputs the response data and the byte number BT of the response data to the answer generation unit 520b together with the answer generation instruction.

Upon receiving the answer generation instruction from the internal bus access control unit 520a, the answer generation unit 520b reads out the bus width information BW corresponding to the command C transmitted to the local bus 555 and the sending unit number SU from the reception control buffer 518. Subsequently, the answer generation unit 520b generates the answer AN of the format shown in FIG. 21B and writes it and data input via the local bus 555 in the transmission buffer 524. It also writes the pointer P indicating the write address of the answer AN into the transmission buffer 524, and the byte number information BT and other information into the transmission control buffer 526. The writing of data in the transmission buffer 524 and the transmission control buffer 526 is performed such that data are written in the addresses instructed by transmission buffer write address and transmission control buffer write address supplied from the answer generation unit 520b to the transmission buffer 524 and the transmission control buffer 526.

The transmission buffer 524 and the transmission control buffer 526 both include two ports. These ports are supplied with the transmission buffer read address and the transmission control buffer read address, respectively, from the system bus transmission control unit 525. In other words, the two buffers 524 and 526 are provided with two ports so that the write and read can be performed simultaneously.

Figure 23:
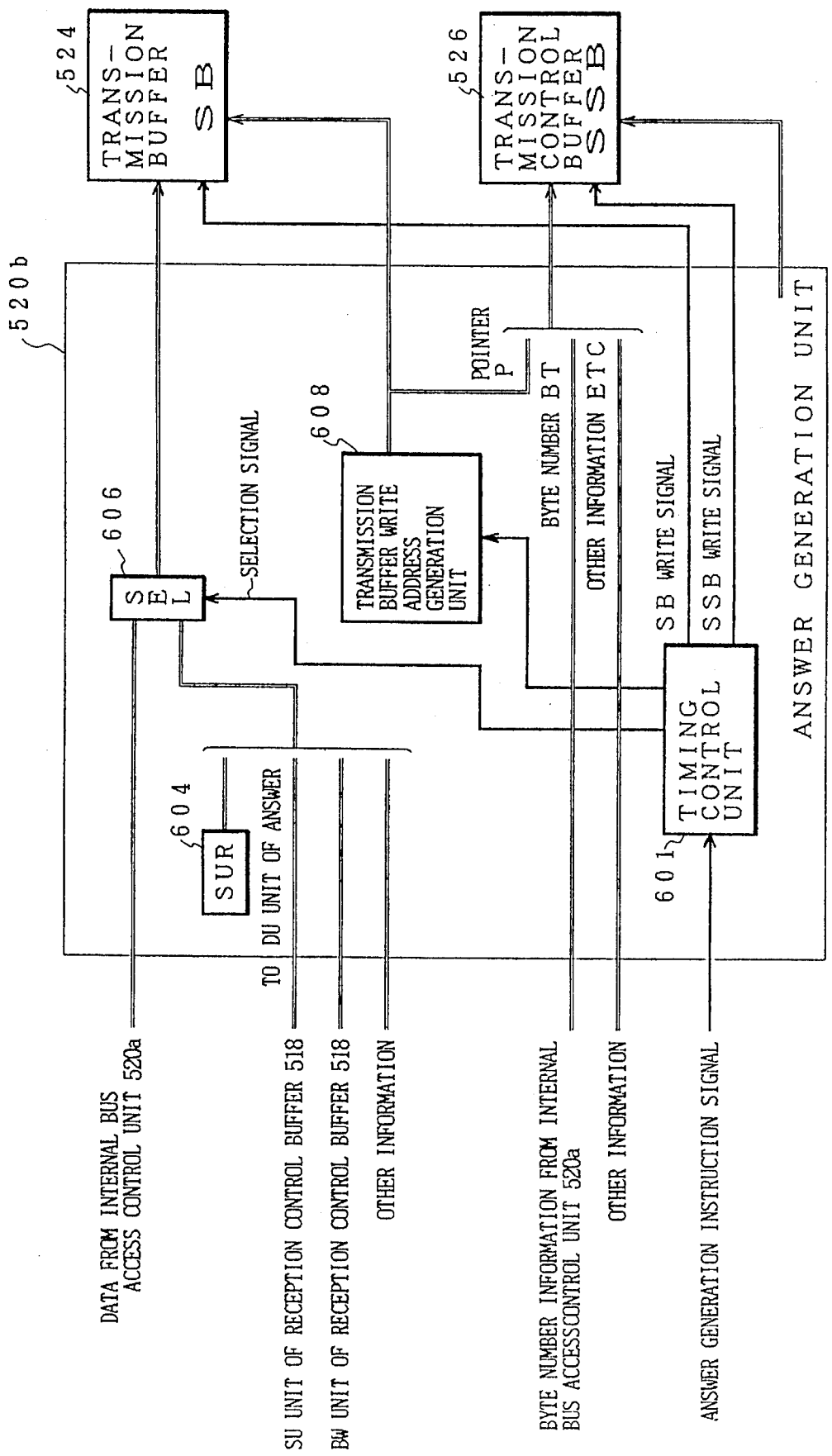
FIG. 23 is a block diagram showing a detailed circuit configuration of an answer generating unit in the second embodiment of the present invention.
Figure 24:
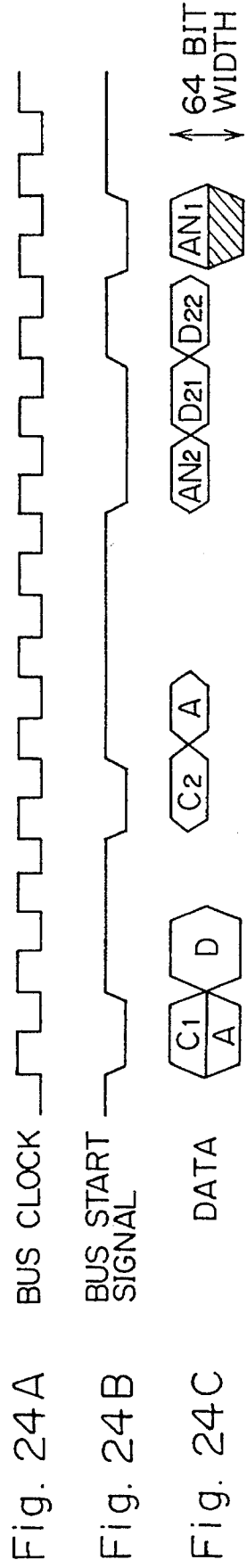
FIGS. 24A to 24C are timing charts to which references will be made in explaining operation of the second embodiment of the present invention.
Figure 25:
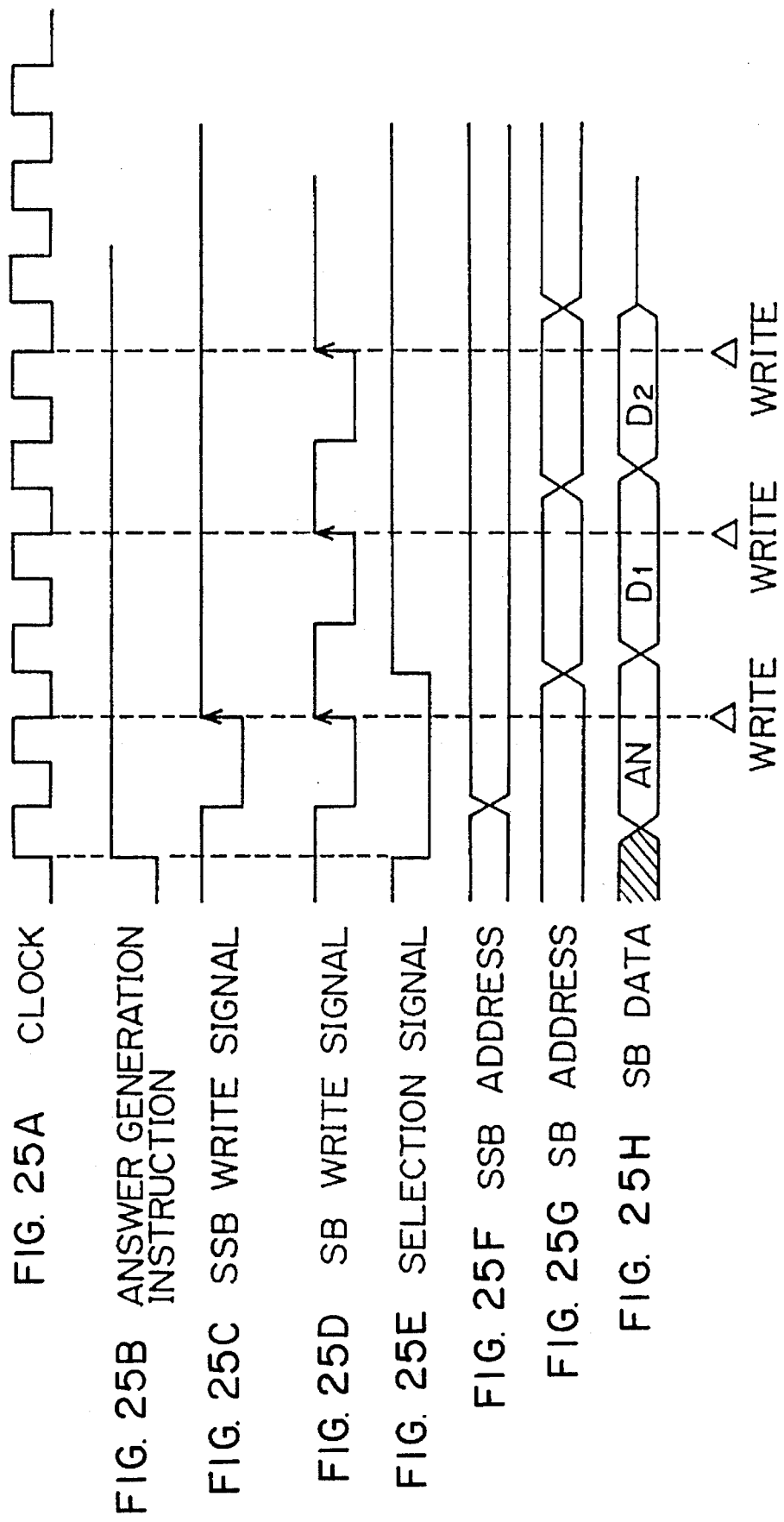
FIGS. 25A to 25H are timing charts to which references will be made in explaining operation timing of the answer generating unit in the second embodiment of the present invention.

FIG. 23 is a block circuit diagram showing the answer generation unit 520b in more detail.

As shown in FIG. 23, the answer generation unit 520b is composed of a sending unit number register (SUR) 604, a selector (SEL) 606, a sending buffer write address generation unit 608 and a timing control unit 610.

The timing control unit 610 receives the answer generation instruction from the internal bus access control unit 520a.

The selector 606 alternatively selects, in response to a selection signal from the timing control unit 610, data from the internal bus access control unit 520a, the sending unit number SU stored in the sending unit number register 604, the bus width information BW from the reception control buffer 526 and other information from the answer generation unit 520b. Input data are sequentially written into the transmission buffer 524 at its storage position designated by a starting transmission buffer write address (address determined by the transmission pointer) applied from the transmission buffer write address generation unit 608 to the transmission buffer 524. In this writing operation, a transmission buffer write signal (SB write signal) is supplied to the transmission buffer 524 from the timing control unit 610. The transmission pointer is transferred to the transmission control buffer 526 together with the byte number information BT from the internal bus access control unit 520a and other information (ETC) and written in the storage position designated by the transmission control buffer write address supplied from the answer generation unit 520b to the transmission control buffer 526. In this writing operation, a transmission control buffer write signal (SSB write signal) is supplied from the timing control unit 610 to the transmission control buffer 526.

Operation of the thus arranged second embodiment is described with reference to timing charts in FIGS. 24A to 24C and FIGS. 25A to 25H.

Initially, a read operation from a unit (hereinafter referred to as a reception unit) accessed by another unit (hereinafter referred to as a transmission unit) via the system bus 401 of the time split transfer system is described. This description assumes that the bus width of the transmission unit which issues the data read command is 32 bits.

The reception unit receives reception data through the receiver 511 and the reception register 514 of the bus interface 510 (610) shown in FIG. 20. Reception is executed by analyzing the 32-bit-wide command (see the read command C2 of FIG. 5; A is the address and this address is 32 bits wide) set in the reception register 514. More specifically, when the read/write information WR determines that the destination unit number DU of the reception command set in the reception register 514 is coincident with the unit number of its own unit, then reception is started. Reception control information corresponding to the data written in the reception buffer 516, that is, the reception control information composed of the pointer P, the read information R, the bus width information BW, the byte number BT, the sending unit number SU and other information ETC is written in the reception control buffer 518. Of the reception control information in buffer 518, the read information R, the bus width information BW, the sending unit number SU and other information ETC are set in the reception command.

Also, the pointer P indicates the pointer value in the read command reception time controlled by the system bus reception control unit 515, and the byte number BT is a value which results from counting the number of bytes of data transferred after the command by the system bus reception control unit 515. The internal bus interface circuit 520 reads out the reception data from the reception buffer 516 at its storage position designated by the pointer P read out from the reception control buffer 518 by the reception control buffer read address transmitted from the internal bus access control unit 520a at a predetermined timing with the reception of this data, for example, in a parallel condition.

The internal bus interface circuit 520 reads out from the reception control buffer 38 the read/write information RW, the bus width information BW, the byte number BT, the sending unit number SU and other information ETC to thereby access the local bus 555. This access is carried out in accordance with the conventional system.

A transmission operation for transmitting data transferred from the local bus 555 in response to the read command by the reception unit will be described next.

When the result of access (read) to the local bus 555 is transferred to the internal bus access control unit 520a, the internal bus access control unit 520a transmits an "H" (active) level answer generation instructing signal (see FIG. 25B) to the answer generation unit 520b. Upon receiving the answer generation instructing signal, the timing control unit 610 outputs an "L" (low) level selection signal (see FIG. 25E), and by this selection signal, the answer information is initially supplied through the selector 606 to the transmission buffer 524 (see AN in row (h) of FIG. 25). In parallel thereto, the timing control unit 610 generates a transmission buffer write address generation signal, and in response to this transmission buffer write address generation signal, a transmission buffer write address generation unit 608 generates a transmission pointer P. The aforementioned answer information is written into the transmission buffer 524 at its storage position designated by the transmission pointer P output from the transmission bus write address generation unit 608, i.e., at the starting position of the transmission information when the SB write signal (see row (d) of FIG. 25) is supplied from the timing control unit 610 to the transmission buffer 524. In the sending unit number storage area within the storage position containing the answer information (see row (b) of FIG. 25), there is written the sending unit number SU from the reception control buffer 518 as the destination unit number DU; in the sending unit number storage area, there is written its own unit number SU read out from the sending unit number register 604; in the bus width information storage area, there is written the bus width information BW read out from the reception control buffer 518; and in the other information storage area, there is written other information ETC generated from the internal bus access control unit 520a. Subsequently, the transmission pointer P, the bus width information BW read out from the reception control buffer 518 and other information ETC are written into the transmission control buffer 526 at its storage position designated by the transmission control buffer address (see row (f) of FIG. 25) generated by the answer generation unit 520b when the SSB write signal (see FIG. 25C) is supplied thereto from the timing control unit 610.

After this, answer information AN is written into the transmission buffer 524, by the "H" level selection signal output from the timing control unit 610. The selector 606 then selects the access result data from the internal bus access control unit 620a and outputs the selected data to the transmission buffer 524. This access result data is a data width determined by the bus width information BW, that is, the width of 32 bits. That data is sequentially written into the transmission buffer 524 at its storage position next to the storage position designated by the above-described transmission pointer (see $D_1$ and $D_2$ in row (h) of FIG. 25). The address (see row (g) of FIG. 25) used in this writing is formed by the transmission pointer. At the completion of the writing, the byte number BT and other information ETC determined in response to the data amount written in the transmission buffer 524 by this writing are transferred from the internal bus interface circuit 520 and written in the byte number storage area and other information storage area within the transmission control information storage area of the transmission control buffer 526.

At a predetermined timing with this writing in the transmission control buffer 526, the reading from the transmission control buffer 526 is performed, for example, in a parallel fashion, by the read address determined by the read control by the system bus transmission control unit 525. This read address then becomes the aforementioned transmission control buffer read address and thereby starts the data read from the transmission control buffer 526. With this data read, transmission control information of format shown in FIG. 21D is read out from the transmission control buffer 526. The data read is then started from the transmission buffer 524 at its storage position designated by the transmission pointer P within the transmission control information. Transmission information initially read out by this data read is the answer information. This answer information is transmitted to the system bus 401 through the transmission register 522 from the driver 512. Furthermore, it is transmitted through the system bus 401 to the unit which transmitted the read command, that is, the unit which transmitted the access request. In transmitting this answer information, the bus width information BW of the transmission information read out from the transmission control buffer 526 is employed, and the answer AN of the format shown in FIG. 21B is transmitted via the 32-bit-wide system bus 401 (see AN2 of FIG. 24C; this AN2 is the answer to the command C2).

After the answer AN2 is transmitted, the data read is continued from the storage position next to the storage position indicated by the transmission pointer P of the transmission buffer 524 to the storage position determined by the byte number BT within the transmission control information. The data width of this read-out data is 32 bits wide.

The access request unit then receives the bus width information BW within the answer AN transferred via the system bus 401 and also receives data transferred next by the 32-bit width indicated by the bus width information BW. That is, the unit which issues the data-read command can read data from another unit in a suitable data width.

A writing operation in the reception unit accessed by another unit via the system bus 401 of the time split transfer system is described. It is assumed that the reception unit bus is 64-bits wide and the system bus 401 is 64-bits wide. This operation is the same as the read out operation for the previously described reception unit except for the following points.

Firstly, read/write information within the 32-bit wide command received is write information W and the 32-bit-wide address A is simultaneously transferred via the system bus 401. Secondly, 64-bit-wide data is transmitted after the command and the address. Thirdly, the number of bytes written into the reception control buffer 518 is the number of bytes constituting the data received. Fourthly, the byte number written into the transmission control buffer 526 is "0" because no data is to be transmitted. Accordingly, only the 32-bit-wide answer AN1 is written into the transmission buffer 524. Incidentally, remaining 32-bit data written in the transmission buffer 524 together with the answer AN1 is meaningless (corresponding to the hatched portion in FIG. 24C).

The command C1, address A, data D and answer AN1 illustrate an example of such a writing operation in the reception unit having only the above differences. The command C1, address A and the data D are information transferred to the reception unit and the answer AN1 is the information returned to the unit which transmits the data-write command.

While the bus width information BW transferred from the sending unit to the destination unit is inserted into the answer to the access of the sending unit and returned to the sending unit as described above, a variant is also possible such that previously-prepared bus width information BW is inserted into the answer and returned to the sending unit which transmits the command.

As described above, according to this embodiment, since the bus width information BW is provided in both the command and the answer, the receiving circuit from the system bus of the time split transfer system can be commonly utilized in the command reception and in the answer reception. Thus, the circuit arrangement of the receiving circuit is simplified.

Further, since the bus width information is formed within the answer, while it is determined whether or not the received answer is transmitted to its own unit, the preparation processing for the data reception becomes possible on the basis of the bus width information. Conversely, if there is no bus width information, the operation for the corresponding bus width must be performed after it is determined that the answer is transmitted to its own unit. Therefore, according to this embodiment, the answer processing can be executed at high speed.

As will be clear from the above explanation, according to the second embodiment of the present invention, since the bus width information is inserted into the answer and this answer is returned to the sending unit (which transmits the arbitrary command) from the reception unit through the system bus of the time split system, the unit which processes arbitrary data within the data width of the system bus of the time split transfer system can be connected to the system bus of the time split system. Accordingly, the present invention can be suitably applied to the expansion of a multi-processor system which flexibly employs the system bus of the time split transfer system. The present invention is excellent in expanding the multi-processor system utilizing the system bus of the time split system.

Figure 13:
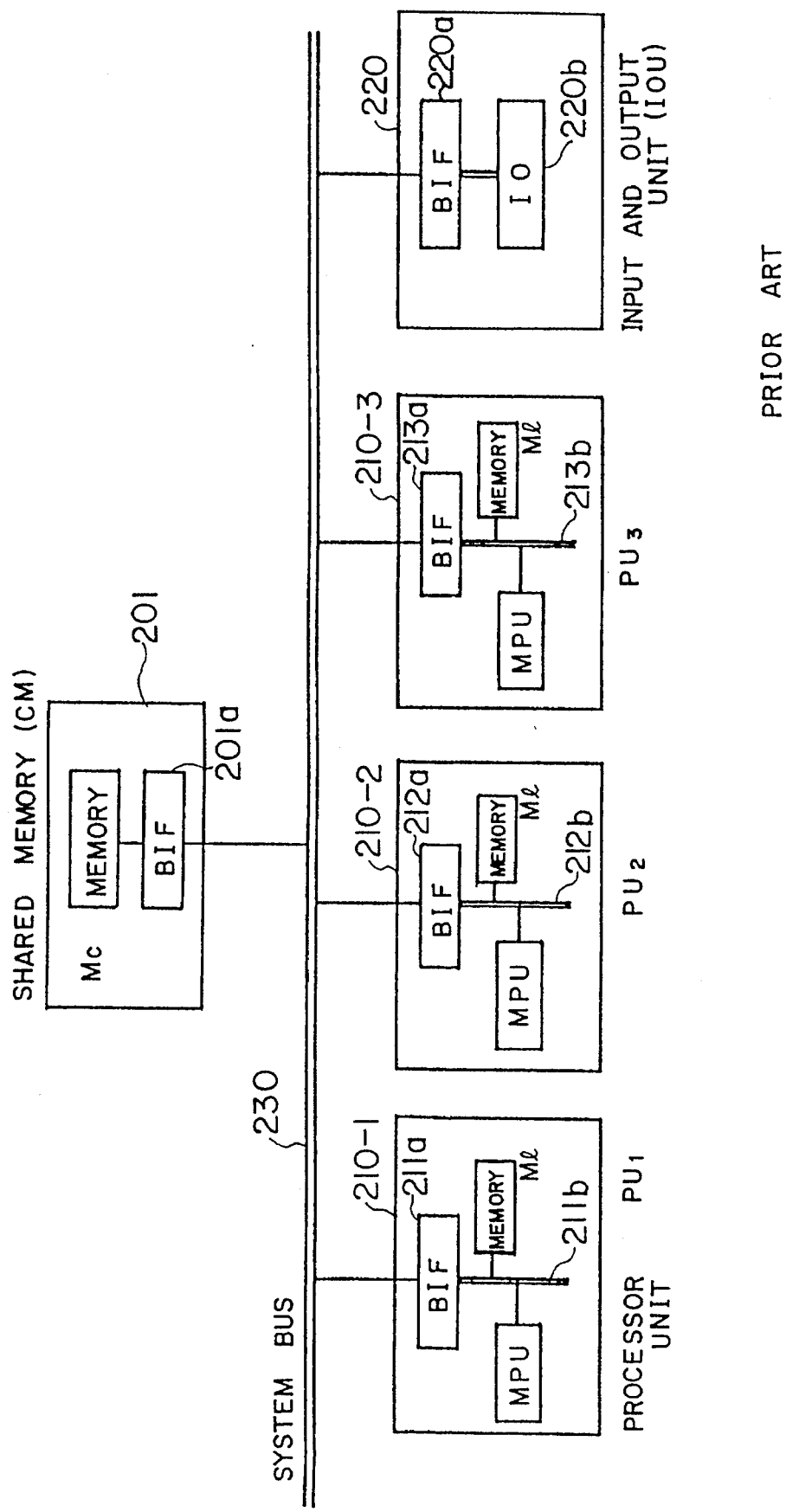
FIG. 13 is a schematic block diagram showing an example of a conventional multi-processor system having a shared memory.
Figure 26:
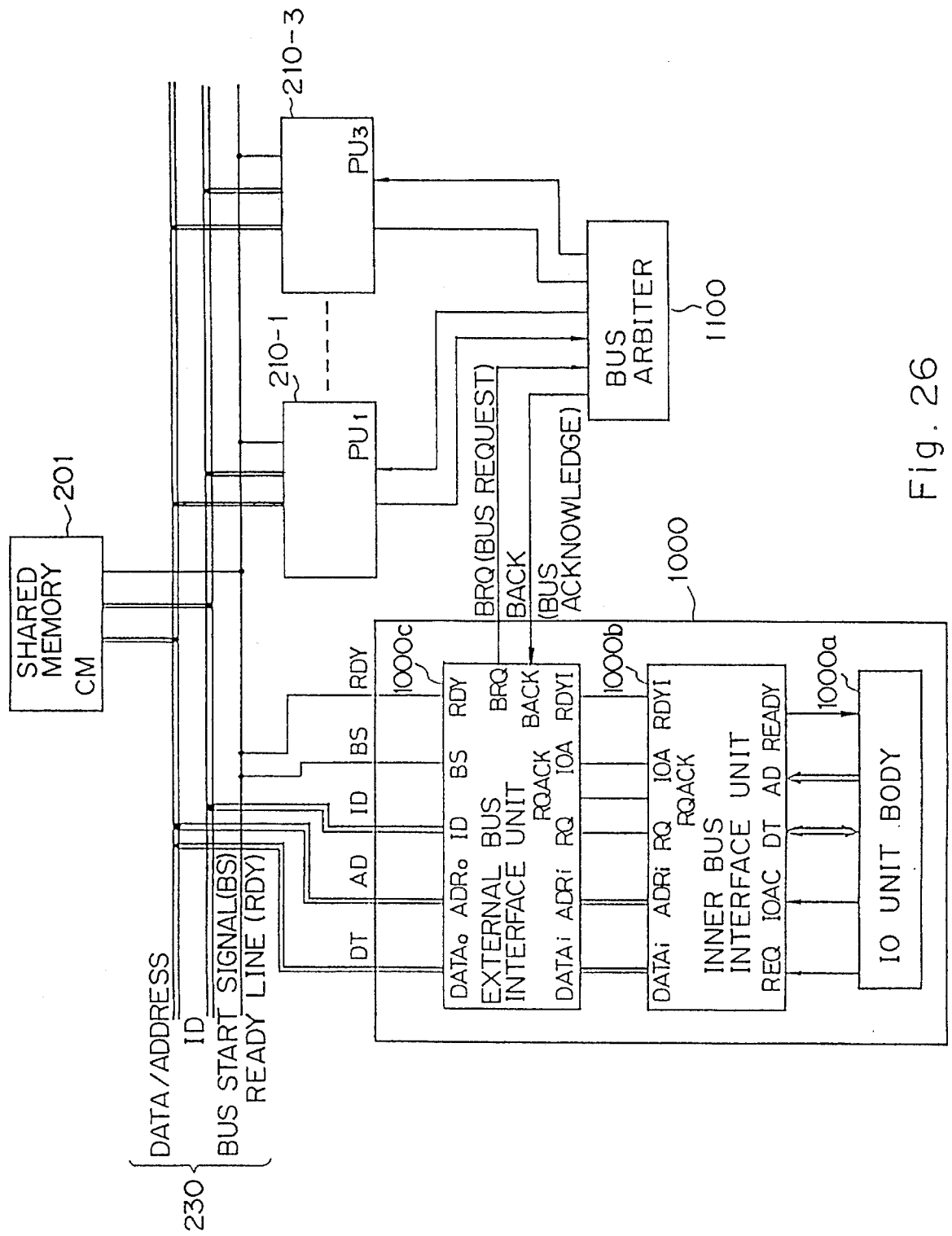
FIG. 26 is a block diagram showing an arrangement of a multi-processor system having a shared memory according to a third embodiment of the present invention.

Finally, a third embodiment corresponding to the third object is described. FIG. 26 is a block diagram showing a system arrangement of a multi-processor system having a shared memory according to the third embodiment of the present invention. In FIG. 26, like parts corresponding to those of FIG. 13 are marked with the same references and therefore need not be described.

Figure 27:
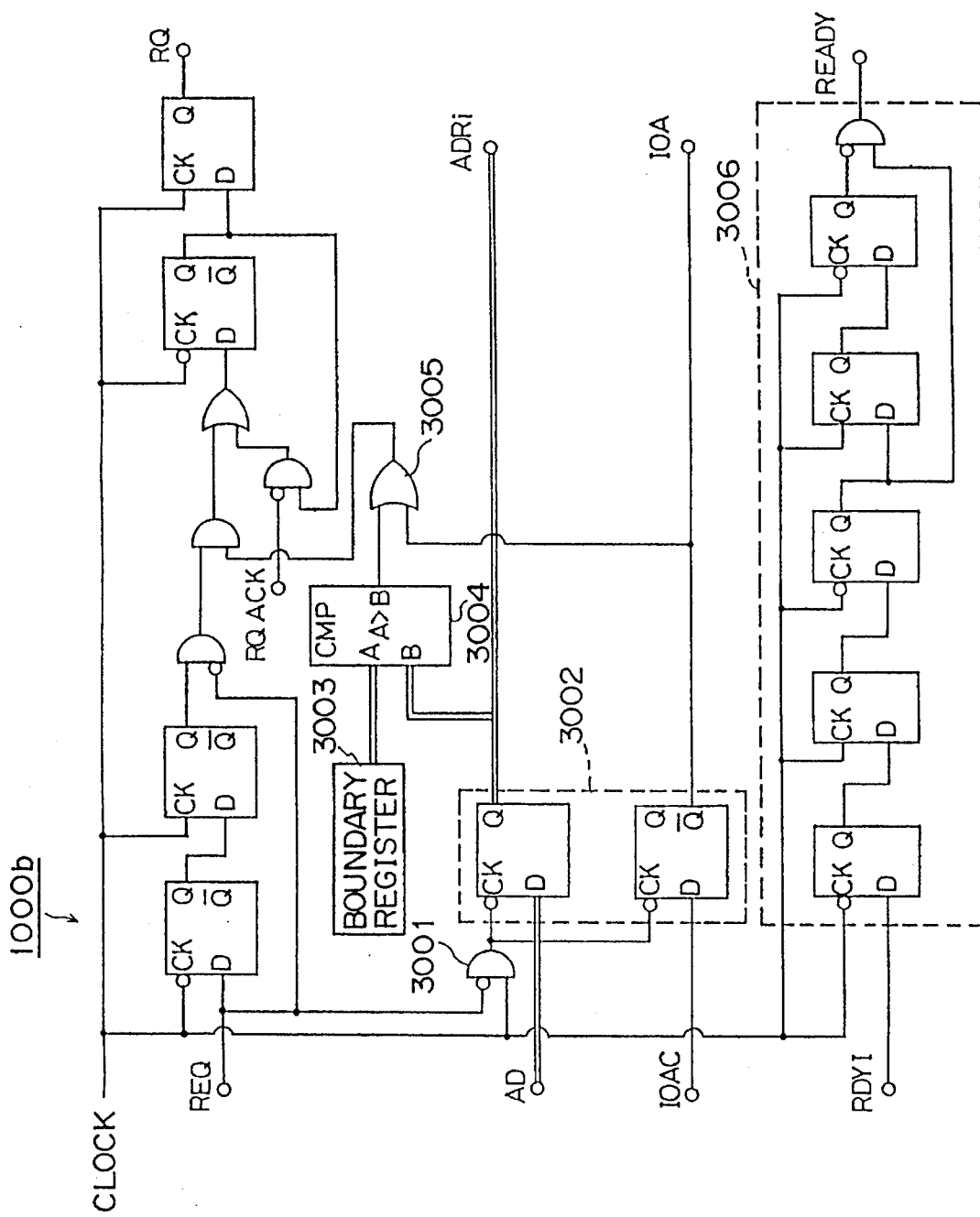
FIG. 27 is a block diagram showing a circuit arrangement of an internal bus interface unit in the third embodiment of the present invention.
Figure 28:
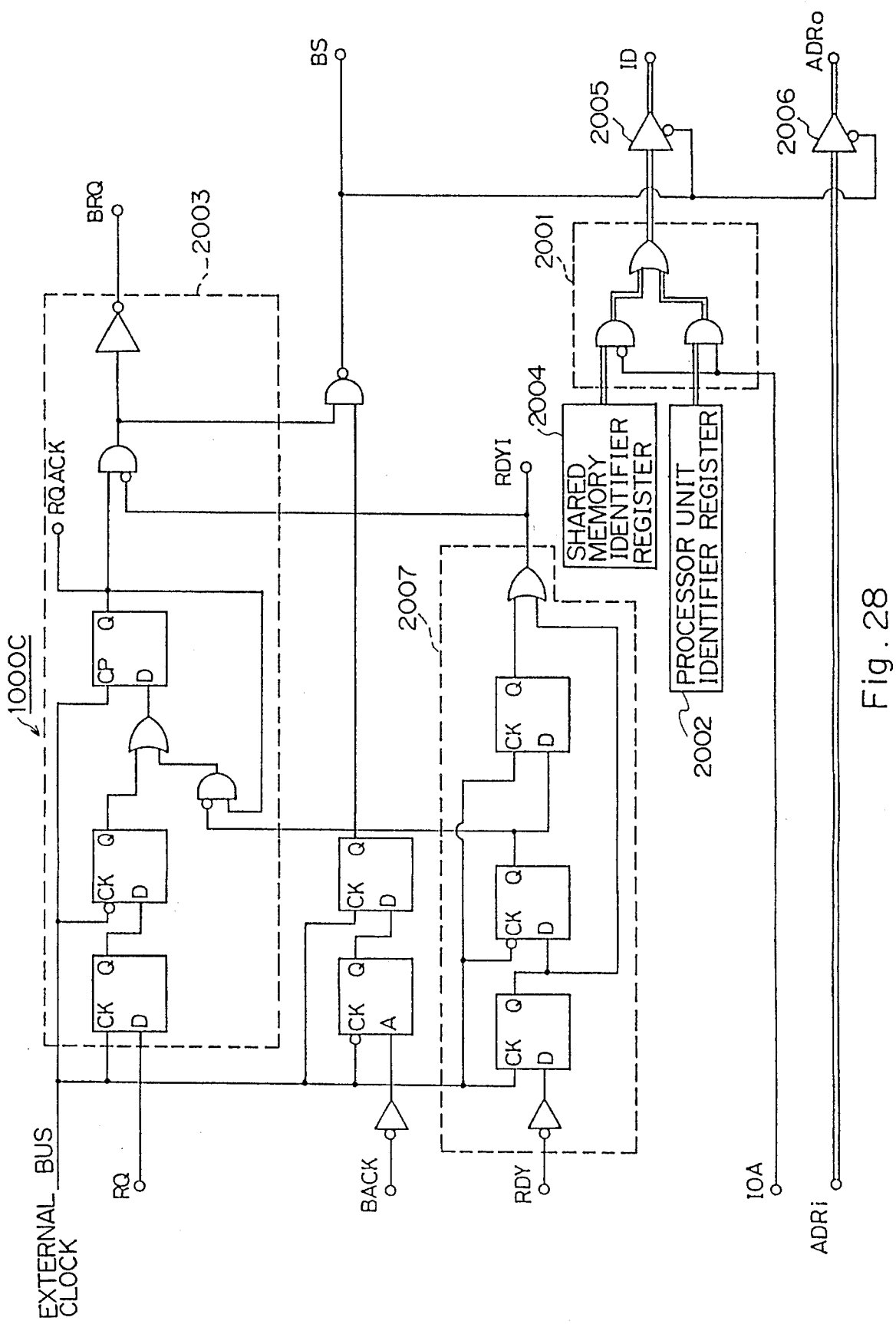
FIG. 28 is a block diagram showing a circuit arrangement of an external bus interface unit in the third embodiment of the present invention.

In FIG. 26, reference numeral 1000 designates an input and output unit (IOU) which is composed of an IO unit body 1000a, an internal bus interface unit 1000b and an external bus interface unit 1000c. FIG. 27 shows in more detail a block circuit diagram of the internal bus interface unit 1000b, and FIG. 28 shows in more detail a block circuit diagram of the external bus interface unit 1000c.

In FIG. 26, reference numeral 1100 designates a bus arbiter which performs an arbitration, such as a decision of utilization right of the system bus 230 among the processor units 210-1 to 210-3 and the input and output unit 1000 on the basis of the priority order. In this embodiment, if access is made from the IO unit body 1000a by the IO access signal IOAC, the internal bus interface unit 1000b outputs a low level "L" access signal IOA and a selector 2001 (shown in FIG. 28) provided in the external bus interface unit 1000c selects and outputs the contents of a processor unit identifier register 2002 which holds the identifiers (IDs) of the respective processor units 210-1 to 210-3 so that, when the access is made by the IO unit body 1000a, not only the shared memory 201 but also the local memory M* within other processor units 210-1 to 210-3 can be accessed.

Figure 29:
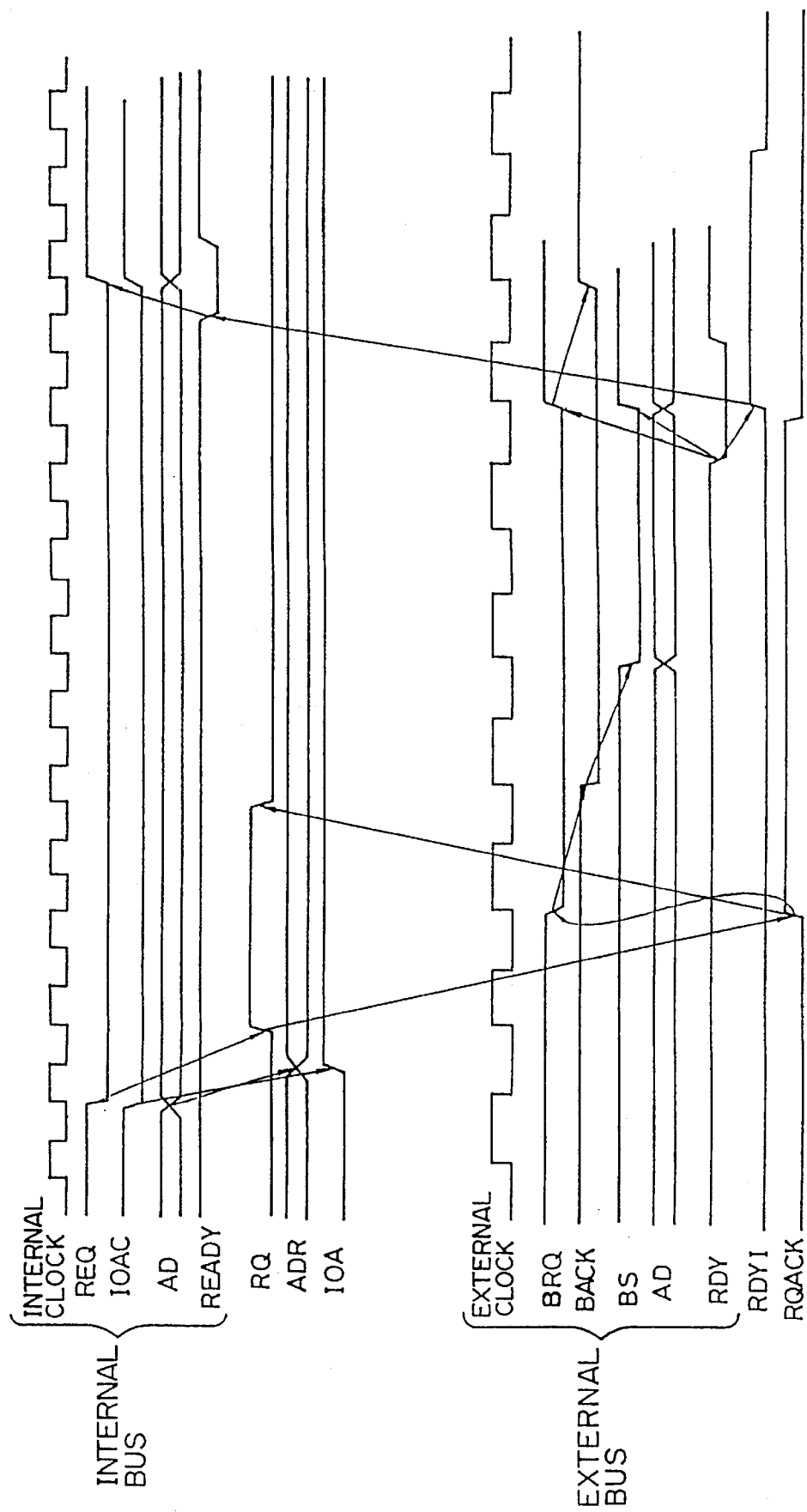
FIG. 29 is a timing chart to which references will be made in explaining the operation of the third embodiment.

The arrangement and operation is described next with reference to the block diagrams in FIGS. 26 to 28 and the chart in FIG. 29.

As illustrated, when the request signal REQ output from the IO unit body 1000a goes low "L" level, address/data (data is not shown) on the internal bus and the IO access signal IOAC are sampled via a gate 3001 and a flip-flop 3002 of the internal bus interface unit 1000b shown in FIG. 27, and an address ADRi and the access signal IOA are output from the internal bus interface unit 1000b and then fed to the external bus interface unit 1000c. In that case, if the shared memory area Mc is accessed, the access signal IOAC goes to high "H" level and the access signal IOA goes to low "L" level.

A register value A in the boundary register 3003 is previously determined and the register value A and the value B of the address ADRi from the flip-flop 3002 are compared by a comparator (CMP) 3004. If the shared memory area Mc is accessed, the value B of the address ADRi is smaller than the register value A of the boundary register 3003 (A> B) so that the output of the comparator 3004 goes to high "H" level and an output of an OR gate 3005 goes to high "H" level. Thus, the request signal RQ to the external bus interface unit 1000c goes to high "H" level. If the request signal RQ goes to high "H" level, then a bus request signal BRQ goes to low "L" level via the gate circuit 2003 of the external bus interface unit 1000c and applied to a bus arbiter 1100. Then, when a bus request permission signal BACK is returned from the bus arbiter 1100, a bus start signal BS goes to low "L" level in the external bus interface unit 1000c. In that case, since the access signal IOA is at low "L" level, the selector 2001 selects the shared memory identifier register 2004, whereby the identifier (ID) for accessing the content of the register 2004, that is, the shared memory 201 is selected and output through a gate 2005 which is set in the pass state by the bus start signal BS. Then, the address ADRi output from the internal bus interface unit 1000b is also output as $ADR_0$ via a gate 2006 which is set in the pass state by the bus start signal BS.

If the local memory area Ml is accessed, the IO access signal IOAC goes to low "L" level and the access signal IOA goes to high "H" level. In that case, since the local memory area Ml is accessed, the value B of the address ADRi becomes larger than the register value A of the boundary register 3003 (B> A). Accordingly, although the output of the comparator 3004 goes to low "L" level, the access signal IOA is at high "H" level so that the output of the OR gate 3005 goes to high "H" level. Thus, the request signal RQ is made high "H" level. If the request signal RQ goes to high "H" level, the bus request signal BRQ goes to low "L" level, and if the bus request permission signal BACK is returned from the bus arbiter 1100, then the bus start signal BS goes to low "L" level. In that case, since the access signal IOA is at high "H" level, the selector 2001 selects the processor unit identifier register 2002. Thus, the identifier for accessing the content of the register 2002, identifying one of the processor units 210-1 to 210-3, is selected and output via the gate 2005, which is set in the pass state by the bus start signal BS whose identifier (ID) is set in the pass state. Then, the address ADRi output from the internal bus interface unit 1000b is output via the gate 2005 which is set in the pass state by the bus start signal BS.

In other words, in the case of an access by the input and output unit 1000, not only the shared memory area Mc but also the respective local memory areas Ml of arbitrary processor units 210-1 to 210-3 can be accessed, thereby making it possible to perform a wider variety of control than in the example of the prior art.

The processor units 210-1 to 210-3 selected by the identifier (ID) make a ready signal (RDY) low "L" level which transmits the answer of normal reception, whereby the input and output unit 1000 finishes the external bus cycle relative to the system bus 230. Further, the ready signal RDY is converted to RDY1 by a gate circuit 2007 in the external bus interface unit 1000c and sent to the internal bus interface unit 1000b, wherein it is converted to a ready signal READY for the IO unit body 1000a by a gate circuit 3006. Thus, the internal bus cycle of the input and output unit 1000 relative to the internal bus is finished.

As described above, according to the present invention, the bus interface of the input and output is provided with a processor unit identifier register (second register) and a selector for selecting the content of the second register by the IO access signal (IOA) so that, when the access is made by the IO unit body, not only the shared memory area but also the local memory area within the processor unit can be accessed, thus making it possible to perform a wider variety of control operation than in the example of the prior art.

While the address space of the shared memory is allocated to an address space of lower order than the local memory of each processor unit in the above embodiment, the present invention is not limited thereto and can be easily applied to a multi-processor system in which the address space of the shared memory is allocated to an address space of higher order than the local memory of each processor unit. In that case, the output level of the compared result of, for example, the comparator 3004 may be inverted.

Having described preferred embodiments of the invention with reference to the accompanying drawings, it is to be understood that the invention is not limited to those precise embodiments and that various changes and modifications thereof could be effected by one skilled in the art without departing from the spirit or scope of the invention as defined in the appended claims.

What is claimed is:

1. In a multi-processor system in which a plurality of CPU boards and a plurality of memory boards, each of the CPU and memory boards having a local bus thereon, are interconnected to a common system bus, a bus right request system comprising:

bus interfaces, each bus interface interconnecting the local bus within one of said CPU and memory boards with the common system bus, said bus interface including memory means for storing queue additional information indicating which of command transfer requests and answer transfer requests are to be issued by said CPU and memory boards; and signalling means for outputting bus interface signals in dependence upon the queue additional information;

a bus arbiter for arbitrating a utilization right of the common system bus for said CPU and memory boards;

command transfer request signal lines, operatively connected to said bus interfaces of said CPU boards and said bus arbiter, for transmitting the command transfer requests from said CPU boards to said bus arbiter;

first answer transfer request signal lines, operatively connected between said bus arbiter and said bus interfaces of said memory boards, for transmitting the answer transfer requests from said memory boards to said bus arbiter; and second answer transfer request signal lines, operatively connected between said bus arbiter and said bus interfaces of said CPU boards, for transmitting the answer transfer requests from said CPU boards to said bus arbiter, said bus interfaces indicating the command transfer requests from said CPU boards by the bus interface signals on said command transfer request signal lines, the answer transfer requests from said memory boards by the bus interface signals on said first answer transfer request signal lines and the answer transfer requests from said CPU boards by the bus interface signals on said second answer transfer request signal lines, in dependence upon the queue additional information, said bus arbiter using signal levels of said command transfer request signal lines and said first and second answer transfer request signal lines to determine which of the command transfer requests and the answer transfer requests have been received, giving higher priority to the answer transfer requests than the command transfer requests in determining which of said CPU and memory boards receives the utilization right of the common system bus.

2. A bus right request system according to claim 1, wherein said bus interface further comprises:

recognizing means for producing a judged result indicating whether either of the command and answer transfer requests should be output in dependence upon the queue additional information;

invert means for supplying inverted information of the judged result;

a first AND gate having inputs operatively connected to receive the judged result from said recognizing means and the queue additional information from said memory means and an output operatively connected to said corresponding command transfer request signal line; and a second AND gate having inputs operatively connected to receive the inverted information of the judged result of said recognizing means and the queue additional information stored in said memory means and an output operatively connected to said corresponding answer transfer request signal line.

3. A bus right request system according to claim 2, wherein said bus arbiter comprises:

a first arbitrating circuit having input terminals operatively connected to receive the command transfer requests from said command transfer request signal lines and having output terminals corresponding to the CPU boards, for indicating a highest priority command transfer request of the command transfer requests received at one time;

a second arbitrating circuit having input terminals operatively connected to receive the answer transfer requests from said first and second answer transfer request signal lines and output terminals corresponding to the CPU and memory boards, for indicating a highest priority answer transfer request of the answer transfer requests received at one time; and a transfer permission signal output circuit having inputs operatively connected to the output terminals of said first arbitrating circuit and said second arbitrating circuit and operatively connected to the CPU and memory boards for outputting a transfer permission signal for the highest priority answer transfer request output from said second arbitrating circuit which is given higher priority than the highest priority command transfer request output from said first arbitrating circuit.

4. A bus right request system according to claim 1, wherein said bus arbiter comprises:

a first arbitrating circuit having input terminals operatively connected to receive the command transfer requests from said command transfer request signal lines and having output terminals corresponding to the CPU boards, for indicating a highest priority command transfer request of the command transfer requests received at one time;

a second arbitrating circuit having input terminals operatively connected to receive the answer transfer requests from said first and second answer transfer request signal lines and output terminals corresponding to the CPU and memory boards, for indicating a highest priority answer transfer request of the answer transfer requests received at one time; and a transfer permission signal output circuit having inputs operatively connected to the output terminals of said first arbitrating circuit and said second arbitrating circuit and operatively connected to the CPU and memory boards for outputting a transfer permission signal for the highest priority answer transfer request output from said second arbitrating circuit which is given higher priority than the highest priority command transfer request output from said first arbitrating circuit.

5. A bus right request system according to claim 1, wherein said bus arbiter processes the answer transfer requests with higher priority than lock transfers and upon receiving an answer transfer request during a lock transfer, said bus arbiter interrupts the lock transfer and outputs a transfer permission signal in response to the answer transfer request.

6. In a multi-processor system having a plurality of units, each connected via a bus interface to a system bus of a time split transfer system having a predetermined bus width, the units including a first unit releasing a bus right of said system bus after transmitting a command to a second unit, the second unit acquiring the bus right of the system bus and returning an answer to the first unit, said bus interface of the second unit comprising:

a receiving unit, operatively connected to said system bus, for receiving the command transmitted from the first unit through said system bus, and for extracting data width information from the command from the first unit, the data width information indicating a number of bits of said system bus used by data communicated between the first and second units through said system bus; and a transmitting unit, operatively connected to said system bus, for transmitting data to other of the plurality of units through said system bus, and for returning an answer to the first unit including the data width information extracted by said receiving unit of the second unit, the first and second units thereafter communicating according to the data width information.

7. In a multi-processor system having a plurality of units, each connected via a bus interface to a system bus of a time split transfer system having a predetermined bus width, the units including a first unit releasing a bus right of said system bus after transmitting a command to a second unit, the second unit acquiring the bus right of the system bus and returning an answer to the first unit, said bus interface of the first unit comprising:

a transmitting unit, operatively connected to said system bus, for transmitting data to other of the plurality of units through said system bus, for inserting into a command data width information indicating a number of bits of said system bus used by data transmitted between the first and second units, and for transmitting the command to the second unit through said system bus, the first and second units thereafter communicating according to the data width information, including returning the answer to the first unit from the second unit.

8. A bus interface of the first unit according to claim 7, further comprising a receiving unit of the first unit, operatively connected to said system bus, for receiving an answer, including data width information, from the second unit through said system bus, for extracting the data width information from the answer, and wherein said receiving unit receives succeeding data from the second unit through said system bus after the answer, with a data width corresponding to the data width information extracted from the answer.

* * * * *

UNITED STATES PATENT AND TRADEMARK OFFICE
CERTIFICATE OF CORRECTION

PATENT NO. : 5,526,495
DATED : June 11, 1996
INVENTOR(S) : Yuji SHIBATA, et al.

It is certified that error appears in the above-indentified patent and that said Letters Patent is hereby corrected as shown below:

Column 5, line 60, change "Ml" to --M$\ell$--.

Column 6, line 7, change "Ml" to --M$\ell$--;
         line 10, change "Ml" to --M$\ell$--;
         line 16, change "Ml" to --M$\ell$--;
         line 23, change "Ml" to --M$\ell$--;
         line 27, change "Ml" to --M$\ell$--; and
         line 30, change "Ml" to --M$\ell$--.

Column 12, line 43, delete "to", second occurrence.

Column 19, line 2, delete "-", both occurrences.

Column 21, line 1, change "Ml" to --M$\ell$--;
         line 4, change "Ml" to --M$\ell$--; and
         line 26, change "Ml" to --M$\ell$--.

Signed and Sealed this

Twenty-second Day of October, 1996

Attest:

BRUCE LEHMAN

*Attesting Officer*      *Commissioner of Patents and Trademarks*